(12) United States Patent
Woodgate et al.

(10) Patent No.: US 11,966,049 B2
(45) Date of Patent: Apr. 23, 2024

(54) PUPIL TRACKING NEAR-EYE DISPLAY

(71) Applicant: RealD Spark, LLC, Boulder, CO (US)

(72) Inventors: Graham J. Woodgate, Henley-on-Thames (GB); Michael G. Robinson, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

(21) Appl. No.: 18/224,849

(22) Filed: Jul. 21, 2023

(65) Prior Publication Data

US 2024/0045202 A1 Feb. 8, 2024

Related U.S. Application Data

(60) Provisional application No. 63/394,370, filed on Aug. 2, 2022.

(51) Int. Cl.
*G02B 27/00* (2006.01)
*F21V 8/00* (2006.01)

(52) U.S. Cl.
CPC ....... *G02B 27/0093* (2013.01); *G02B 6/0048* (2013.01); *G02B 6/0058* (2013.01)

(58) Field of Classification Search
CPC . G02B 27/01; G02B 27/0172; G02B 27/0093
See application file for complete search history.

(56) References Cited

U.S. PATENT DOCUMENTS

| | | | |
|---|---|---|---|
| 1,128,979 A | 2/1915 | Hess |
| 1,970,311 A | 8/1934 | Ives |
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |

(Continued)

FOREIGN PATENT DOCUMENTS

| | | |
|---|---|---|
| CN | 1142869 A | 2/1997 |
| CN | 1377453 A | 10/2002 |

(Continued)

OTHER PUBLICATIONS

JP-2015-512901 1st Office Action dated Mar. 28, 2017.

(Continued)

*Primary Examiner* — William J Carter
(74) *Attorney, Agent, or Firm* — Penny L. Lowry

(57) ABSTRACT

A near-eye display apparatus comprises a spatial light modulator illuminated by a directional backlight and a magnifying lens arranged to provide a magnified wide field of view image to an eye of a user. The directional backlight comprises an array of light sources and a stepped waveguide comprising a curved reflective end. Light propagates along the waveguide without loss and is reflected from the reflective end. The steps of the waveguide are arranged to provide a virtual optical window for each light source. The magnifying lens images the virtual optical window to a real pupil (Continued)

window in an eyebox. The real pupil window may be steered in response to the measured location of the user's pupil. High illumination efficiency is provided to the user in a thin form factor.

16 Claims, 16 Drawing Sheets

(56) References Cited

U.S. PATENT DOCUMENTS

| | | |
|---|---|---|
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,688,035 A | 11/1997 | Kashima et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,684,588 B2 | 4/2014 | Ajichi et al. |
| 8,714,804 B2 | 5/2014 | Kim et al. |
| 8,736,967 B1 | 5/2014 | Browne et al. |
| 8,752,995 B2 | 6/2014 | Park |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 10,054,732 B2 | 8/2018 | Robinson et al. |
| 10,191,196 B2 * | 1/2019 | Morozov ............ G02B 6/0031 |
| 10,425,635 B2 | 9/2019 | Woodgate et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |

(56) References Cited

U.S. PATENT DOCUMENTS

| | | |
|---|---|---|
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |

(56) References Cited

U.S. PATENT DOCUMENTS

| | | |
|---|---|---|
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0169838 A1 | 7/2012 | Sekine |
| 2012/0182482 A1 | 7/2012 | Byoun et al. |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0294579 A1 | 11/2012 | Chen |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0170004 A1 | 7/2013 | Futterer |
| 2013/0222384 A1 | 8/2013 | Futterer |
| 2013/0230136 A1 | 9/2013 | Sakaguchi et al. |
| 2013/0235561 A1 | 9/2013 | Etienne et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2015/0029754 A1 | 1/2015 | Ouderkirk et al. |
| 2015/0070773 A1 | 3/2015 | Wang et al. |
| 2015/0085091 A1* | 3/2015 | Varekamp .............. G02B 30/33 348/59 |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0033710 A1* | 2/2016 | Kim .................... G02B 6/0073 362/602 |
| 2018/0113310 A1 | 4/2018 | Rolland et al. |
| 2018/0284341 A1 | 10/2018 | Woodgate et al. |
| 2018/0313510 A1 | 11/2018 | Albou et al. |
| 2019/0056086 A1 | 2/2019 | Nambara et al. |
| 2020/0049995 A1 | 2/2020 | Urey et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 A1 | 12/2006 |
| EP | 2003394 A2 | 12/2008 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004265813 A | 9/2004 |
| JP | 2004319364 A | 11/2004 |
| JP | 2005135844 A | 5/2005 |
| JP | 2005181914 A | 7/2005 |
| JP | 2005183030 A | 7/2005 |
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2008204874 A | 9/2008 |
| JP | 2010160527 A | 7/2010 |
| JP | 2011192468 A | 9/2011 |
| JP | 2012060607 A | 3/2012 |
| JP | 2014022309 A | 2/2014 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| TW | 200528780 A | 9/2005 |
| WO | 1998021620 A1 | 5/1998 |
| WO | 1999011074 A1 | 3/1999 |
| WO | 2001061241 A1 | 8/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |

(56) References Cited

FOREIGN PATENT DOCUMENTS

| WO | 2011022342 A2 | 2/2011 |
|---|---|---|
| WO | 2011068907 A1 | 6/2011 |
| WO | 2011149739 A2 | 12/2011 |
| WO | 2012158574 A1 | 11/2012 |
| WO | 2013137161 A1 | 9/2013 |
| WO | 2014130860 A1 | 8/2014 |

OTHER PUBLICATIONS

JP-2015-512905 1st Office Action (translated) dated Feb. 7, 2017.
Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al.: "RGBD Camera Effects", Aug. 1, 2012 (Aug. 1, 2012), XP055335831, Sibgrapi - Conference on Graphics, Patterns and Images Retrieved from the Internet: URL:https://www.researchgate.net/profile/Leandro Cruz/ publication/233398182 RGBD Camera Effects/links/0912f50a2922010eb2000000.pdf [retrieved on Jan. 17, 2017].
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority mailed Aug. 28, 2013.
PCT/US2013/041228 International search report and written opinion of international searching authority mailed Aug. 23, 2013.
PCT/US2013/041235 International search report and written opinion of international searching authority Mailed Aug. 23, 2013.
PCT/US2013/041548 International search report and written opinion of international searching authority mailed Aug. 27, 2013.
PCT/US2013/041619 International search report and written opinion of international searching authority mailed Aug. 27, 2013.
PCT/US2013/041655 International search report and written opinion of international searching authority mailed Aug. 27, 2013.
PCT/US2013/041683 International search report and written opinion of international searching authority mailed Aug. 27, 2013.
PCT/US2013/041697 International search report and written opinion of international searching authority mailed Aug. 23, 2013.
PCT/US2013/041703 International search report and written opinion of international searching authority mailed Aug. 27, 2013.
PCT/US2013/063125 International search report and written opinion of international searching authority mailed Jan. 20, 2014.
PCT/US2013/063133 International search report and written opinion of international searching authority mailed Jan. 20, 2014.
PCT/US2013/077288 International search report and written opinion of international searching authority mailed Apr. 18, 2014.
PCT/US2014/017779 International search report and written opinion of international searching authority mailed May 28, 2014.
PCT/US2014/042721 International search report and written opinion of international searching authority mailed Oct. 10, 2014.
PCT/US2015/054523 International search report and written opinion of international searching authority dated Mar. 18, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority mailed Jan. 20, 2017.
PCT/US2017/012203 International search report and written opinion of international searching authority mailed Apr. 18, 2017.
PCT/US2023/028359 International search report and written opinion of the international searching authority mailed Oct. 20, 2023.
Robinson et al., U.S. Appl. No. 15/165,960 entitled "Wide Angle Imaging Directional Backlights" filed May 26, 2016. A copy of the application is available to Examiner on the USPTO database and has not been filed herewith.
Robinson et al., U.S. Appl. No. 15/290,543 entitled "Wide angle imaging directional backlights" filed Oct. 11, 2016. A copy of the application is available to Examiner on the USPTO database and has not been filed herewith.
Robinson, U.S. Appl. No. 13/300,293 entitled "Directional flat illuminators" filed Nov. 18, 2011.A copy of the application is available to Examiner on the USPTO database and has not been filed herewith.
RU-2013122560 First office action dated Jan. 22, 2014.
RU-2013122560 Second office action dated Apr. 10, 2015.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, p. 19714-19 (2009).
Mola and Jones, "Rapid Object Detection using a Boosted Cascade of Simple Features", pp. 1-9 CVPR 2001.
Zach et al., "A Duality Based Approach for Realtime TV-L1 Optical Flow", Pattern Recognition (Proc. DAGM), 2007, pp. 214-223.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography. html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
Cheng et al., "Design and manufacturing AR head-mounted displays: A review and outlook", Light: Advanced Manufacturing (2021)2:24, Official journal of the JHL 2689-9620, pp. 1-20.
CN-201180065590.0 Office fourth action dated Jan. 4, 2017.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.

(56) References Cited

OTHER PUBLICATIONS

CN-201380026059.1 Chinese 2nd Office Action of the State Intellectual Property Office of P.R. dated Feb. 22, 2017.
CN-201380026059.1 Chinese 1st Office Action of the State Intellectual Property Office of P.R. dated Apr. 25, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
CN-201480023023.2 Office second action dated May 11, 2017.
Cootes et al., "Active Appearance Models", IEEE Trans. Pattern Analysis and Machine Intelligence, 23(6):681-685, 2001.
Cootes et al., "Active Shape Models - Their Training and Application" Computer Vision and Image Understanding 61 (1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al.: "Stereoscopic and autostereoscopic display-systems", -IEEE Signal Processing Magazine, May 1, 1999 (1999-05-01 ), pp. 85-99, XP055305471, Retrieved from the Internet: RL:http://ieeexplore.IEEE.org/ iel5/79/16655/00768575.pdf [retrieved on Sep. 26, 2019].
International search report and written opinion of international searching authority for co-pending PCT application No. PCT/US2013/041619 mailed Aug. 27, 2013.
JP-2013540083 Notice of reasons for rejection of Jun. 30, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
Jeong et al., Holographically customized optical combiner for eye-box extended near-eye display, Opt. Express 27, 38006-38018 (2019) Dec. 23, 2019.
PCT/US2023/025706 International search report and written opinion of the international searching authority mailed Oct. 5, 2023.
PCT/US2023/025722 International search report and written opinion of the international searching authority mailed Oct. 6, 2023.
PCT/US2023/029866 International search report and written opinion of the international searching authority mailed Nov. 27, 2023.
EP-23207269.4 European Extended Search Report of European Patent Office dated Dec. 22, 2023.
KR1020207030206 Notice of Preliminary Rejection dated Jan. 4, 2024.

\* cited by examiner

PUPIL TRACKING NEAR-EYE DISPLAY

TECHNICAL FIELD

This disclosure generally relates to waveguides for head-mounted display apparatuses and illumination systems therefor.

BACKGROUND

Head-worn displays may be arranged to provide fully immersive imagery such as in virtual reality (VR) displays or augmented imagery overlayed over views of the real world such as in augmented reality (AR) displays. If the overlayed imagery is aligned or registered with the real-world image it may be termed Mixed Reality (MR). In VR displays, the optical system is typically opaque to the real world, whereas in AR displays the optical system is partially transmissive to light from the real-world.

The optical systems of AR and VR displays aim to provide images to at least one eye of a user with full colour, high resolution, high luminance and high contrast; and with wide fields of view (angular size of image), large eyebox sizes (the geometry over which the eye can move while having visibility of the full image field of view). Such displays are desirable in thin form factors, low weight and with low manufacturing cost and complexity.

BRIEF SUMMARY

According to a first aspect of the present disclosure, there is provided a near-eye display apparatus comprising: a directional backlight comprising: a waveguide comprising an input end; and an array of light sources disposed at different input positions in a lateral direction across the input end of the waveguide and arranged to input light into the waveguide, the waveguide further comprising first and second, opposed guide surfaces for guiding the light from the light sources along the waveguide, and a reflective end facing the input end for reflecting the light from the light sources back through the waveguide, the first guide surface being arranged to guide light by total internal reflection and the second guide surface having a stepped shape comprising (a) a plurality of facets oriented to extract the light from the light sources, after reflection from the reflective end, out of the waveguide through the first guide surface, and (b) intermediate regions between the facets that are arranged to guide light through the waveguide; a spatial light modulator arranged to modulate the light extracted from the waveguide to form an image; and a magnifying lens having positive optical power, the magnifying lens being arranged to magnify the image formed by the spatial light modulator for the pupil of an eye of a user, and wherein the near-eye display apparatus is arranged to direct the light from the light sources into respective, pupil optical windows distributed across an eyebox in the lateral direction in dependence on the input positions of the light sources. Illumination from the light sources is efficiently directed into the pupil of the eye of the viewer. Power efficiency is advantageously increased. In the case that a battery is provided, then the size of the battery may be reduced. Headset weight may be reduced. Alternatively the equipment may be operated for longer on the original size battery and interval between charges may be increased. The luminous intensity of stray light that is directed to non-imaging surfaces within the near-eye display apparatus is reduced so that image contrast is increased. Thickness of the backlight may be reduced for high luminance output. Heat dissipation may be reduced for high luminance.

The reflective end may be curved. The reflective end may have positive optical power in a lateral direction across the waveguide. The facets of the waveguide may be curved. Advantageously the uniformity of light output across the waveguide may be increased, and uniformity across the eyebox increased. Thickness of the directional backlight may be reduced.

The facets may have negative optical power and may be arranged to direct the light from the light sources to provide respective, virtual illumination optical windows in output directions distributed in the lateral direction in dependence on the input positions of the light sources, and the magnifying lens may be arranged to image the virtual illumination optical windows to form the pupil optical windows. Advantageously efficient illumination of the eyebox may be provided in arrangements wherein the eye relief is greater than the focal length of the magnifying lens.

The near-eye display apparatus further may comprise a Fresnel lens that has negative optical power and may be arranged to direct the light from the light sources to provide respective, virtual illumination optical windows in output directions distributed in the lateral direction in dependence on the input positions of the light sources; and the magnifying lens may be arranged to image the virtual illumination optical windows to form the pupil optical windows. Advantageously efficient illumination of the eyebox may be provided in arrangements wherein the eye relief is greater than the focal length of the magnifying lens. Improved image uniformity and efficiency may be provided in the transverse direction orthogonal to the lateral direction at the eyebox.

The facets may have positive optical power and may be arranged to direct the light from the light sources to provide respective, real illumination optical windows in output directions distributed in the lateral direction in dependence on the input positions of the light sources, and the magnifying lens may be arranged to image the real illumination optical windows to form the pupil optical windows. Advantageously efficient illumination of the eyebox may be provided in arrangements wherein the eye relief is less than the focal length of the magnifying lens.

The near-eye display apparatus may further comprise a Fresnel lens that has positive optical power and may be arranged to direct the light from the light sources to provide respective, real illumination optical windows in output directions distributed in the lateral direction in dependence on the input positions of the light sources; and the magnifying lens may be arranged to image the real illumination optical windows to form the pupil optical windows. Advantageously efficient illumination of the eyebox may be provided in arrangements wherein the eye relief is less than the focal length of the magnifying lens. Improved image uniformity and efficiency may be provided in the transverse direction orthogonal to the lateral direction at the eyebox.

The near-eye display apparatus may further comprise: a pupil detection system arranged to detect the location of the pupil of the eye; and a control system arranged to control the array of light sources to provide illumination of pupil optical windows that illuminate the pupil and not to provide illumination to at least some pupil optical windows that do not illuminate the pupil. Advantageously efficiency of illumination may be increased and stray light reduced so that image contrast is increased.

The directional backlight may further comprise a rear reflector comprising a linear array of reflective facets arranged to reflect light from the light sources, that may be transmitted through the plurality of extraction facets of the waveguide, back through the waveguide to exit through the first guide surface. Advantageously optical efficiency may be increased.

The reflective facets of the rear reflector may be curved. The facets of the waveguide and the reflective facets of the rear reflector may be inclined in the same sense in a common plane orthogonal to said lateral direction. The pupil optical windows provided by light reflected from the rear reflector may be common to the pupil optical windows provided by light output directly from the waveguide. Advantageously improved efficiency and uniformity may be achieved.

The rear reflector may be spaced from the waveguide such that the light from an individual facet of the waveguide may be incident on plural reflective facets of the rear reflector, the rear reflector further comprising intermediate facets extending between the reflective facets of the rear reflector, the intermediate facets being inclined in an opposite sense from the reflective facets of the rear reflector at an angle such that said light from the light sources that may be transmitted through the plurality of facets of the waveguide may be not incident on the intermediate facets. Advantageously Moire artefacts may be reduced and image uniformity increased. Power efficiency may be improved.

The facets of the waveguide may have an inclination that varies across the array of facets. The reflective facets of the rear reflector may have an inclination that varies across the array of reflective facets. Improved uniformity may be achieved in the transverse direction across each pupil optical window. Advantageously image uniformity may be increased.

According to a second aspect of the present disclosure, there is provided a head-worn display apparatus comprising a near-eye display apparatus according to the first aspect that may be arranged to extend across at least one eye of a viewer when the head-worn display apparatus is worn. Advantageously a virtual reality display apparatus may be provided with high uniformity and high efficiency for each eye. Power consumption may be reduced or image brightness increased. High dynamic range (HDR) operation may be achieved. Stray light that reflects from internal parts of the head-worn display apparatus may be reduced, achieving increased image contrast.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in computing environments and automotive environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
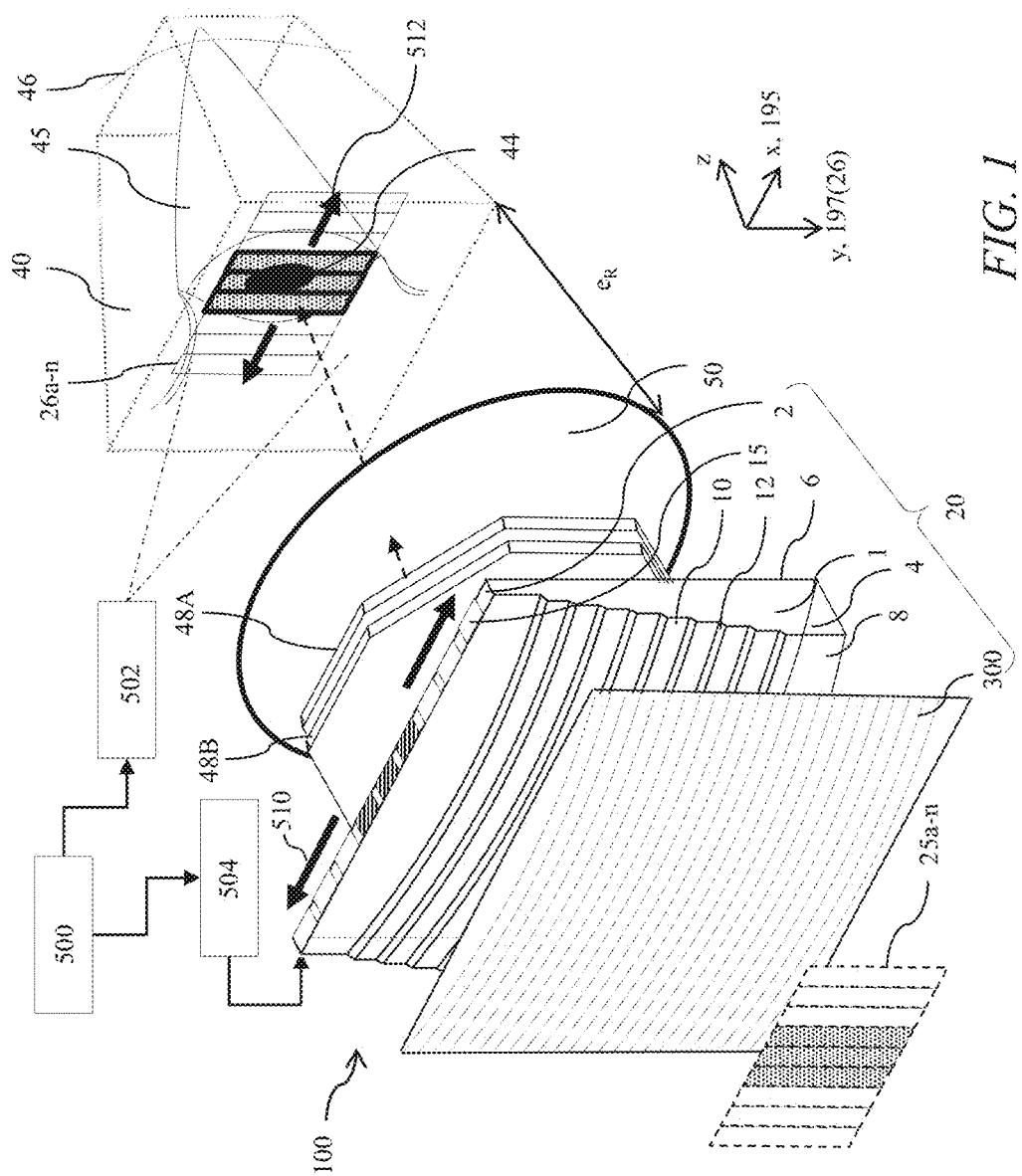
FIG. 1 is a schematic diagram illustrating a rear perspective view of a near-eye display apparatus comprising a directional backlight.

The structure and operation of various near-eye display apparatuses will now be described. In this description, common elements have common reference numerals. It is noted that the disclosure relating to any element applies to each device in which the same or corresponding element is provided. Accordingly, for brevity such disclosure is not repeated.

It would be desirable to provide a near-eye display apparatus 100 with a thin form factor, large freedom of movement, high resolution, high brightness, high efficiency and wide field of view.

FIG. 1 is a schematic diagram illustrating a rear perspective view of a near-eye display apparatus 100 comprising a directional backlight 20.

In the present description, a near-eye display apparatus 100 is provided near to an eye 45, to provide light to the pupil 44 of the eye 45 of a viewer 47. In an illustrative embodiment, the eye 45 may be arranged at a nominal viewing distance $e_R$ of between 5 mm and 100 mm and preferably between 8 mm and 20 mm from the output surface of the near-eye display apparatus 100. Such displays are distinct from direct view displays wherein the viewing distance is typically greater than 100 mm. The nominal viewing distance $e_R$ may be referred to as the eye relief.

The near-eye display apparatus 100 comprises directional backlight 20 and spatial light modulator 48.

In operation, it is desirable that the spatial pixel data provided on the spatial light modulator 48 is directed to the pupil 44 of the eye 45 as angular pixel data. The operation of the magnifying lens 50 will be described further hereinbelow with respect to FIG. 7.

The pupil 44 is located in a spatial volume near to the display apparatus 100 commonly referred to as the exit pupil 40, or eyebox. When the pupil 44 is located within the exit pupil 40 at eye relief distance ex, the viewer 47 is provided with a full image without missing parts of the image, that is the image does not appear to be vignetted at the viewer's retina 46.

The shape of the exit pupil 40 is determined at least by the imaging properties and sizes of the magnifying lens 50 and directional backlight 20. The maximum eye relief distance $e_{Rmax}$ refers to the maximum distance of the pupil 44 from the display apparatus 100 wherein no image vignetting is present. Increased exit pupil 40 size achieves an increased viewer freedom and an increase in $e_{Rmax}$ as will be described further hereinbelow.

The directional backlight 20 comprises an array of light sources 15, a stepped waveguide 1, and a surface relief rear reflector 300. Optionally, the rear reflector 300 may be omitted. Advantageously stray light may be reduced.

In the embodiment of FIG. 1, the spatial light modulator 48 comprises a full colour spatial light modulator 48A and a contrast-increasing spatial light modulator 48B. Spatial light modulator 48 may have shapes such as octagonal shapes arranged to provide large and substantially symmetric horizontal and vertical fields of view, or may be rectangular or other shapes to achieve desirable fields of view when viewed through magnifying lens 50 from headbox 40.

Stepped waveguide 1 comprises an input end 2. The array of light sources 15 is disposed at different input positions in a lateral direction 195 (x-axis) across the input end 2 of the waveguide 1.

The waveguide 1 further comprises first and second, opposed guide surfaces 6, 8 for guiding light along the waveguide 1. The stepped waveguide 1 may be formed by a moulding process wherein the mould comprises the steps, or may be a structured stepped surface 8 that is applied to a planar tapered waveguide 1 after moulding of the waveguide 1.

A curved mirror 4 faces the input end 2 for reflecting the input light back through the waveguide 1. The curved mirror 4 is an example of the reflective end of the waveguide 1. The curved mirror 4 may be a moulded end of the waveguide 1 and may be coated with a reflective material such as aluminium, silver or a polymer stack such as ESI™ from 3M Corporation. Other examples of reflective end may be Fresnel mirrors as described hereinbelow. The reflective end may be formed as part of the waveguide 1 during moulding, or may be attached to a waveguide 1 after moulding.

The first guide surface 6 is arranged to guide light by total internal reflection and the second guide surface 8 has a stepped shape comprising (a) a plurality of facets 12 oriented to reflect light from the light sources 15, after reflection from the reflective end 4, through the first guide surface 6. The light is guided into illumination optical windows 25 in output directions distributed in the lateral direction 195 to the normal to the first guide surface 8 in dependence on the input positions as indicated by arrows 510. The first guide surface also comprises intermediate regions 10 between the facets 12 that are arranged to guide light through the waveguide 1.

In the present embodiments, the term 'optical window' refers to images that are either real images 26 or virtual images 25 of the light sources 15a-n in at least the lateral direction 195. The term 'optical window' does not, in the present embodiments, refer to transparent windows, or other physical structures.

The near-eye display apparatus 100 further comprises: a pupil detection system 502 arranged to detect the location of the pupil of the eye. Pupil detection system 502 may comprise, for example, a camera and an infra-red light source that can detect reflections from the eye as it moves. A control system 500 is arranged to control the array of light sources 15*a-n* to provide illumination of pupil optical windows 26*a-n* that illuminate the pupil 44 and not to provide illumination to at least some pupil optical windows 26*a-n* that do not illuminate the pupil 44.

Light source driver 504 is arranged to control the light sources 15 in response to the detected location of the pupil 44.

The present embodiments are arranged to increase the efficiency of illumination of the eyebox 40 and in particular the region around the pupil 44 of the eye 45 by not directing light to regions away from the pupil 44. In operation, increased efficiency of illumination may advantageously achieve various combinations of at least (i) reduced power consumption; (ii) reduced battery size and weight; (iii) reduced heat generation; (iv) increased brightness for increased image realism; (v) reduced stray light to increase image contrast; (vi) increased image uniformity; (vii) low thickness; and (viii) reduced cost.

The structure of the near-eye display apparatus 100 will now be described in further detail.

Figure 2:
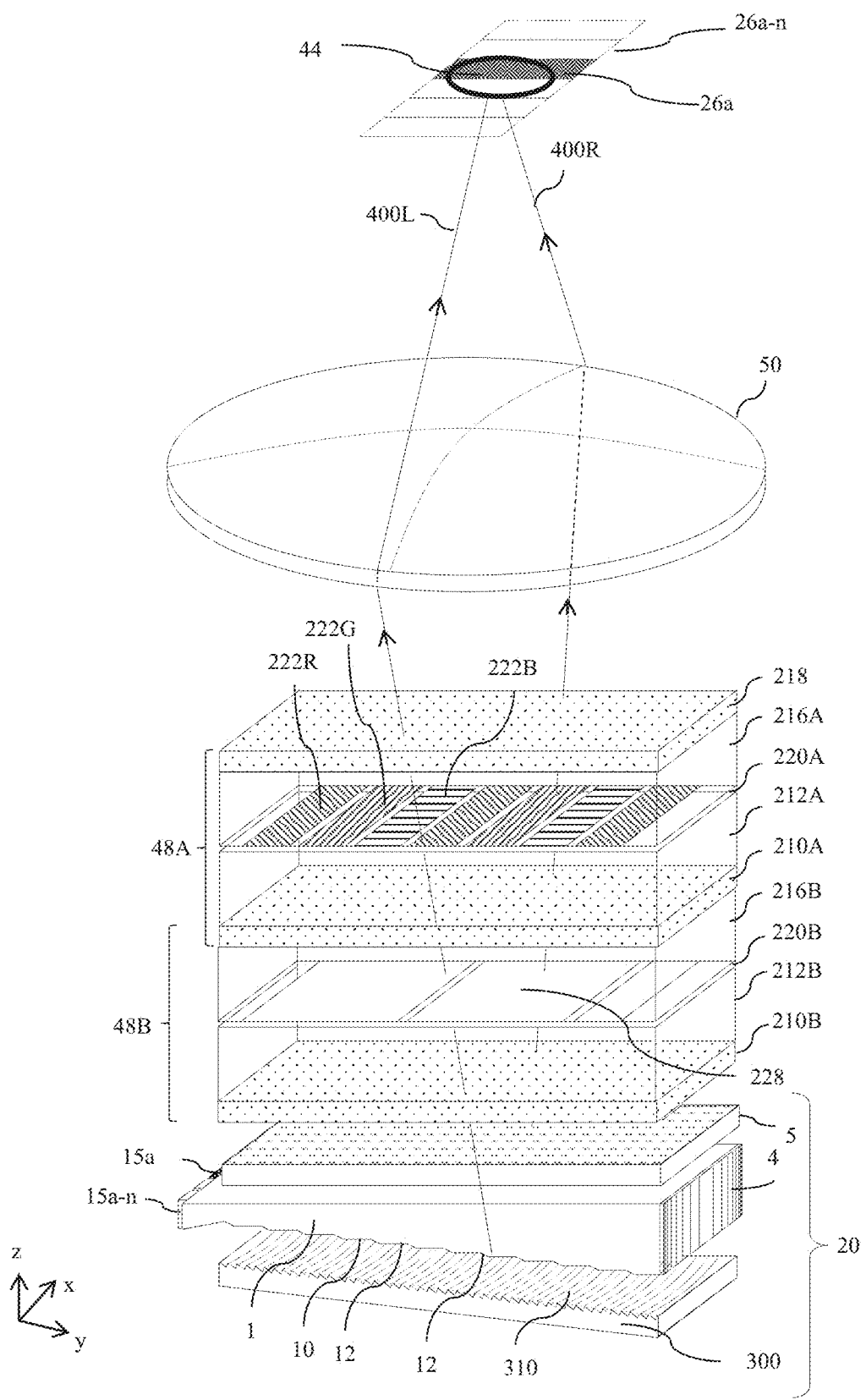
FIG. 2 is a schematic diagram illustrating a side perspective view of a near-eye display apparatus comprising the directional backlight.

FIG. 2 is a schematic diagram illustrating a side perspective view of a near-eye display apparatus 100 comprising the directional backlight 20. Features of the embodiment of FIG. 2 not discussed in further detail may be assumed to correspond to the features with equivalent reference numerals as discussed above, including any potential variations in the features.

FIG. 2 illustrates that the curved mirror 4 of FIG. 1 may be provided by the Fresnel equivalent of the curved mirror 4. Advantageously the size of the waveguide may be reduced.

Full colour spatial light modulator 48A is a transmissive spatial light modulator such as a liquid crystal display comprising red pixels 222R, green pixels 222G and blue pixels 222B arranged in an array in pixel layer 220. Transparent substrates 212A, 216A and polarisers 210A, 218 are arranged on opposing sides respectively of the pixel layer 220. It may be desirable to further increase the contrast ratio of the spatial light modulator 48 arrangement. Optional contrast-increasing spatial light modulator 48B is further provided with pixels 228 provided in layer 220B between transparent substrates 212A, 216A and polarisers 210B, 210A. In operation, the pixels 228 are provided with image information to achieve increased contrast ratio of the output image. Spatial light modulator 48B may be a monochrome LCD, and may have a lower pixel density that the spatial light modulator 48A. Spatial light modulator 48B may have non-rectangular shaped addressable pixels (not illustrated) with at least some edges angled with respect to the pixel edges of spatial light modulator 48A, so that Moiré artefact is produced away from the horizontal and vertical directions to which the eye is most sensitive. The visibility of Moiré artefact between pixel and addressing structures of spatial light modulators 48A and 48B may advantageously be reduced. High dynamic range operation may advantageously be achieved.

In alternative embodiments a small diffusion (not shown) may be introduced between spatial light modulators 48A and spatial light modulator 48B in order to further reduce the visibility of the Moiré artefact. In alternative embodiments the contrast-increasing spatial light modulator 48B may be omitted. Advantageously cost, weight, power consumption and thickness is reduced.

There is a correspondence between the light sources 15*a-n* and location in the lateral direction 195 of the pupil optical windows 26*a-n* as will be described further hereinbelow. FIG. 2 further shows light rays 400R, 400L that are output from a light source 15*a* and directed by the directional backlight 20 and magnifying lens 50 to the pupil optical window 26*a*.

Diffusers 5 may be provided to reduce non-uniformities and Moiré in the illumination of the spatial light modulator 48 and the pupil optical windows 26.

In an alternative embodiment (not shown), the rear reflector 300 may be replaced by a light absorber such as black velvet, carbon feather or nano black in order to absorb the light leakage though the stepped surface 8 and prevent stray light from being visible to the eye. Advantageously this may be cheaper than rear reflector 300.

The structure and operation of the waveguide 1 will now be described further.

Figure 3A:
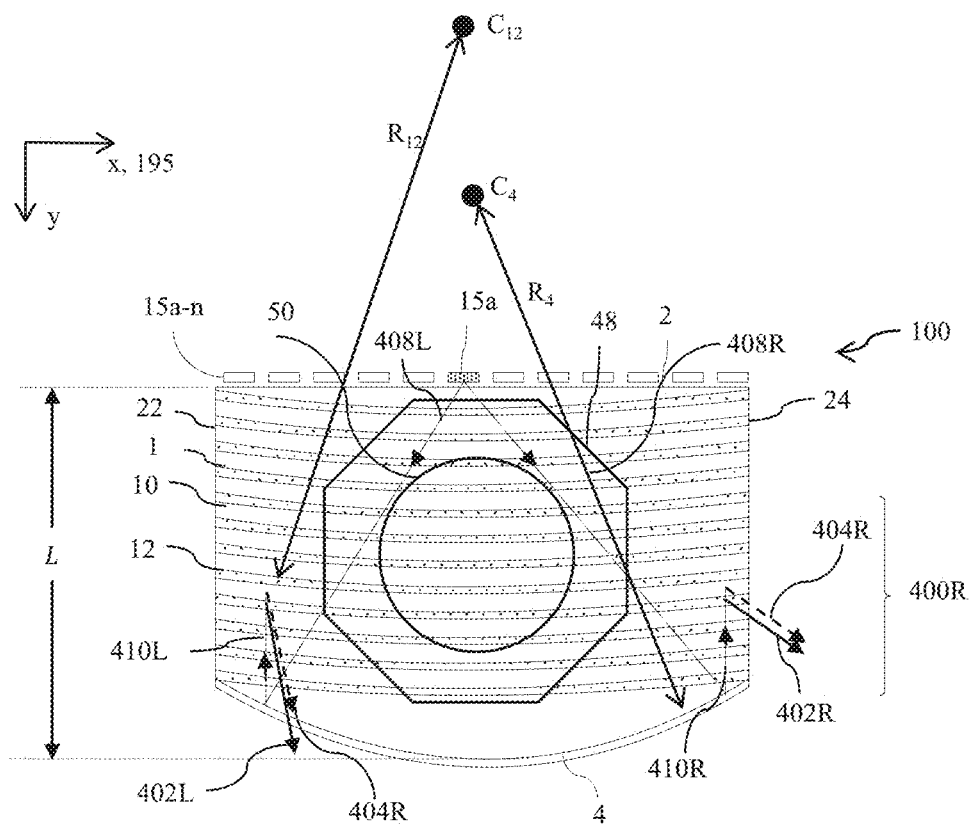
FIG. 3A is a schematic diagram illustrating a front view of a stepped waveguide.
Figure 3B:
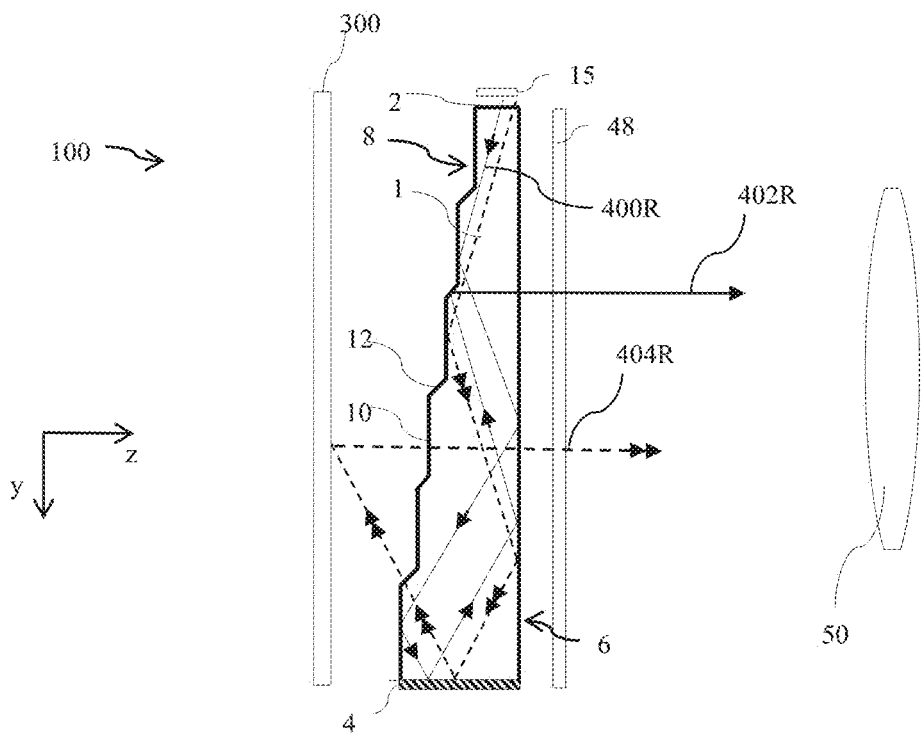
FIG. 3B is a schematic diagram illustrating a side view of a stepped waveguide.
Figure 3C:
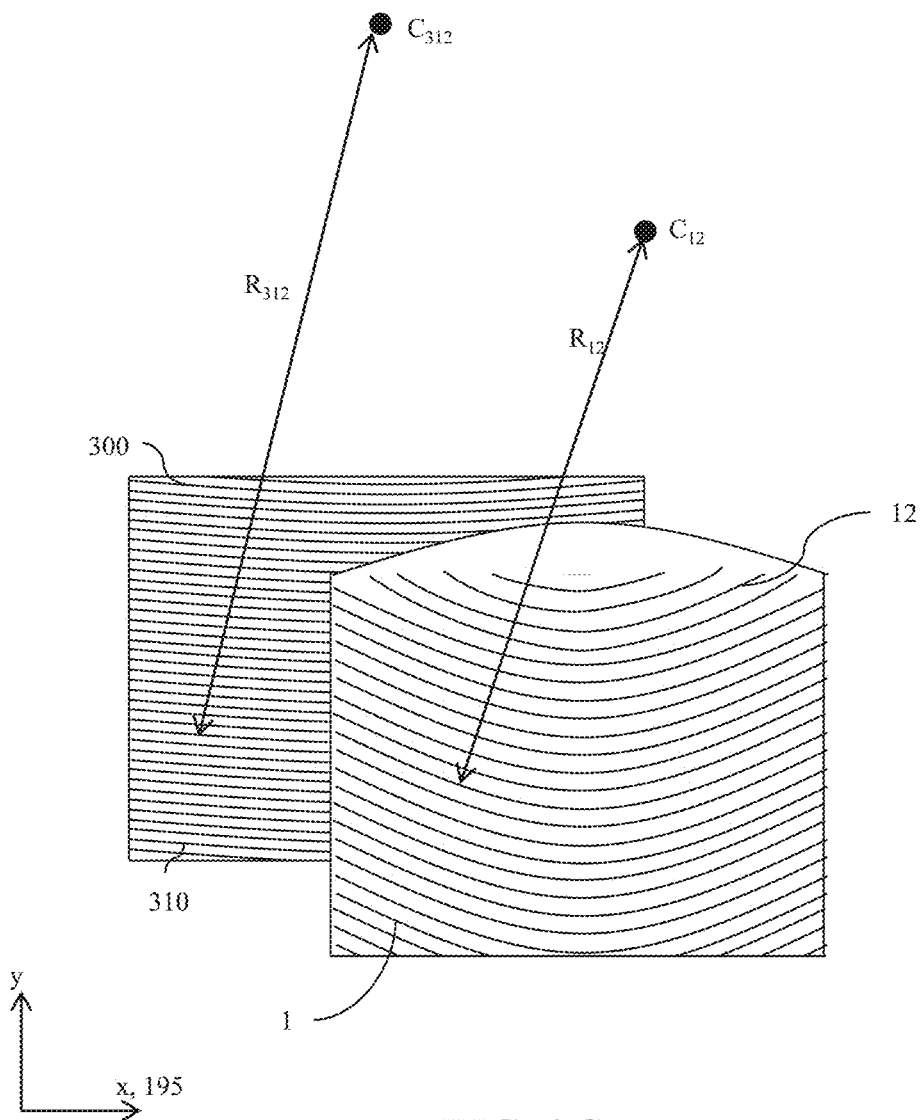
FIG. 3C is a schematic diagram illustrating a front view of a stepped waveguide comprising curved facets and a rear reflector comprising curved facets.

FIG. 3A is a schematic diagram illustrating a front view of a stepped waveguide 1; FIG. 3B is a schematic diagram illustrating a side view of a stepped waveguide 1; and FIG. 3C is a schematic diagram illustrating a front view of a stepped waveguide 1 comprising curved facets 12 and a rear reflector 300 comprising curved reflective facets 312. Features of the embodiments of FIGS. 3A-C not discussed in further detail may be assumed to correspond to the features with equivalent reference numerals as discussed above, including any potential variations in the features.

Considering FIG. 3A, waveguide 1 has sides 22, 24 arranged between the first and second light guiding surfaces 6, 8.

The array of light sources 15*a-n* are disposed at different input positions in a lateral direction 195 across the input end 2 of the waveguide 1 and arranged to input light into the waveguide 1.

The curved mirror 4 (being an example of the reflective end) faces the input end 2 for reflecting the light from the light sources 15*a-n* back through the waveguide 1 and has positive optical power for light rays 408L, 408R. The reflective end thus has positive optical power in a lateral direction 195 across the waveguide 1.

The centre of curvature $C_4$ of the curved mirror 4 is on the same side of the curved mirror 4 as the light sources 15. Illustrative diverging light rays 408L, 408R from the light source 15*a*, are reflected from the curved mirror 4 so that light rays 410L, 410R are parallel.

The curved facets 12 are arranged to reflect the light rays 410L, 410R after reflection from the curved mirror 4 and have negative optical power, so that parallel light rays 410L, 410R are output as diverging light rays 402L, 402R. The centre of curvature $C_{12}$ is on the same side of the curved mirror 4 as the centre of curvature $C_4$. However the optical power is different because the nominal direction of propagation of light rays 410L along the waveguide 1 is reversed. The operation of the curved facets 12 with negative optical power will be described further with reference to FIGS. 8A-B for example.

Considering FIG. 3B, the first guide surface 6 is arranged to guide light by total internal reflection and the second guide surface 8 has intermediate regions 10 between the facets 12 that are arranged to guide light through the waveguide 1. Input light ray 400R is guided within the waveguide 1 after being input at the input end 2 and propagates to the reflective end 4 that has optical power in the lateral direction 195.

After reflection, light rays are redirected towards the facets 12 by guiding at the first light guiding surface 6 and the intermediate regions 10.

On the right side of the waveguide 1, some of the light rays 402R are reflected by total internal reflection or Fresnel reflection at the facets 12, and output through the first light guiding surface 6. Other light rays 404R are transmitted by the facets 12 and incident onto the rear reflector 300. As will be described hereinbelow, the prismatic surface of the rear reflector 300 is arranged to direct the light rays 404R to the same illumination optical window 25 as the light rays 402R, that is rays 402R, 404R are parallel.

For the left side of the waveguide 1, light rays 402L, 404L are similarly provided, however the light rays 402L, 404L diverge from the light rays 402R, 404R. Such divergence provides an illumination optical window 25 that is a virtual image, that is the waveguide 1 is arranged between the output side and the illumination optical window 25 as will be described further hereinbelow.

Considering FIG. 3C, the reflective facets 312 of the rear reflector 300 may be curved with a different radius of curvature $R_{312}$ to the radius of curvature $R_{11}$ of the facets 12 of the waveguide 1 to achieve parallel rays 402, 404. The same pitch $P_{26}$ of the pupil optical windows 26 may be provided by both the waveguide 1 and rear reflector 300. Advantageously efficiency may be increased.

Arrangements of light source 15 array at the input side will now be described.

Figure 4A:
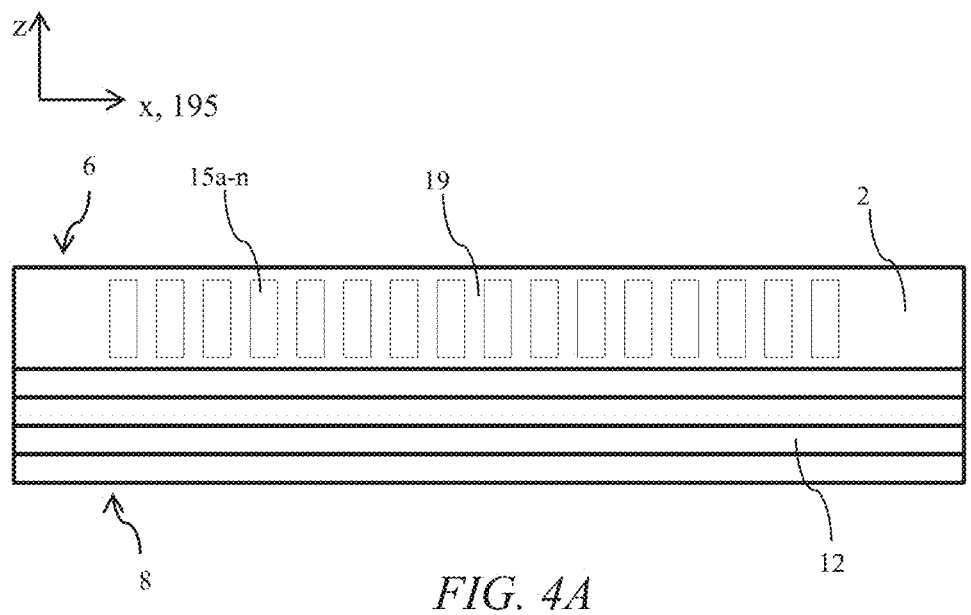
FIG. 4A is a schematic diagram illustrating a top view of a stepped waveguide comprising an illustrative arrangement of light sources.

FIG. 4A is a schematic diagram illustrating a top view of a stepped waveguide 1 comprising an illustrative arrangement of light sources 15a-n. Features of the embodiment of FIG. 4A not discussed in further detail may be assumed to correspond to the features with equivalent reference numerals as discussed above, including any potential variations in the features.

The light sources may be LEDs 15 that are arranged with uniform spacing and may have light-emitting areas that have gaps 19 arranged therebetween. Such gaps 19 may be smoothed from the pupil optical windows 26 by means of diffusers 5 of the optical stack. The gaps 19 may be a small fraction, for example less than 50% of the width of the emitting regions. And may be formed from silicon walls for example, with the light sources 15a-n forming an integrated body.

It may be desirable to reduce the visibility of gaps 19 that may be imaged to the pupil optical windows 26.

Figure 4B:
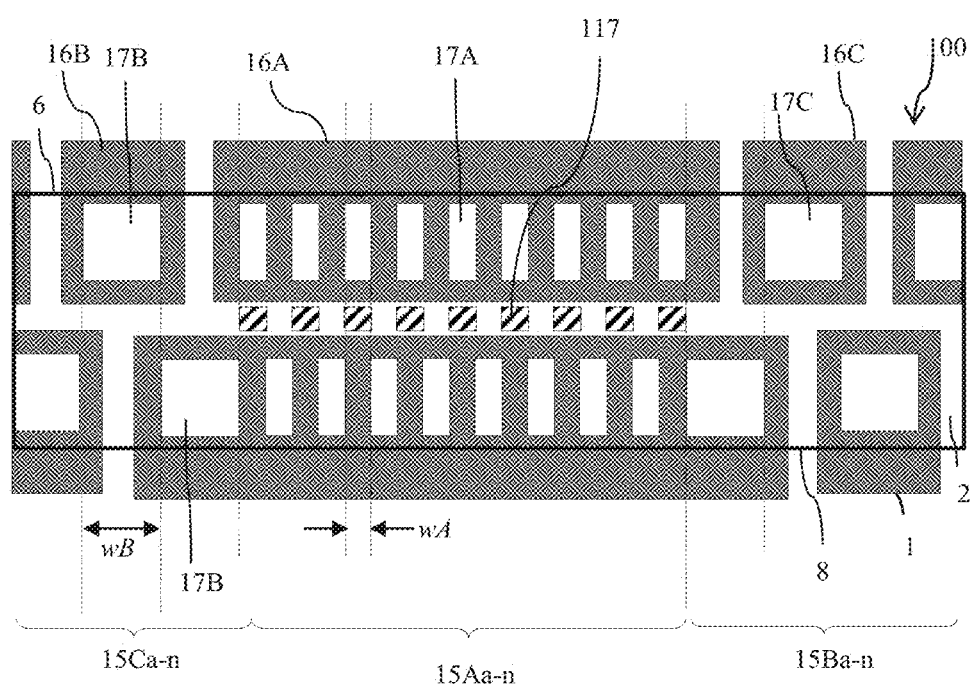
FIG. 4B is a schematic diagram illustrating a top view of a stepped waveguide comprising an illustrative arrangement of light sources.

FIG. 4B is a schematic diagram illustrating a top view of a stepped waveguide 1 comprising a different illustrative arrangement of light sources 15a-n. Features of the embodiment of FIG. 4B not discussed in further detail may be assumed to correspond to the features with equivalent reference numerals as discussed above, including any potential variations in the features.

In FIG. 4B the facets 12 are omitted for clarity of explanation.

In comparison to the arrangement of FIG. 4A, the alternative embodiment of FIG. 4B comprises emitting regions 17 of the light sources 15 that are provided with different widths $w_A$ and $w_B$ in the lateral direction 195. The light sources 15Aa-n have a width $w_A$ of emitting region 17A that is smaller than the width we of emitting region 17B, 17C of the light sources 15Ba-n and 15Ca-n that are arranged outside the light sources 15Aa-n in the lateral direction, that is the light sources 15Aa-n are arranged between the light sources 15Ba-n and 15Ca-n.

In the alternative embodiment of FIG. 4B, the packages 16A comprise emitting apertures 17A, 17B. Advantageously the light sources 17B provide light output that is contiguous in the lateral direction.

The light sources 15Aa-n may be provided at least in part by micro-LEDs, that is light-emitting material such as gallium nitride with a chip size that is less than 300 micrometres, preferably less than 200 micrometres, and more preferably less than 100 micrometres. Advantageously light cones density 26Aa-n with high density in the lateral direction may be achieved.

The light sources 15Ba-n may be provided by larger chip sizes for example greater than 300 micrometres. Advantageously the cost and complexity of the light source packages 16 and control system may be reduced.

In other embodiments the height of the light-emitting area 17 of the light sources 15a-n (in the direction orthogonal to the lateral direction) may vary across the input direction. Light sources 15 with high luminous flux output may be driven with reduced current. Advantageously output efficiency may be increased.

In other embodiments, the width in the lateral direction of the emitting regions 17 of the light sources 15a-n may be different across the input side 2 so that the pitch of pupil optical windows 26 varies with pupil 44 location in the eyebox 40. Advantageously non-uniformities of illumination towards the edge of the eyebox 40 may be reduced.

The width of light sources 15 may be increased in regions of the input side where low resolution of addressability of pupil optical windows 26 is acceptable. Advantageously cost and complexity may be reduced. The width of light sources 15 may be reduced in regions of the input side 2 where high resolution of addressability of pupil optical windows 26 is desirable. Advantageously increased precision of pupil optical windows 26 may be provided.

The light sources 15a-n may be driven with different currents to achieve desirable variation of luminance with eye position in the eyebox. The different currents may be arranged to provide compensation for non-uniform luminance from the magnifying lens with eyebox location. Advantageously image uniformity may be improved.

Light sources 15 may include at least one additional infra-red light source 117 such as an LED array which is operated to produce an infra-red reflection from the eye 45 and co-operates with the pupil detection system 502 as described elsewhere herein.

The structure and operation of the rear-reflector will now be further described.

Figure 5A:
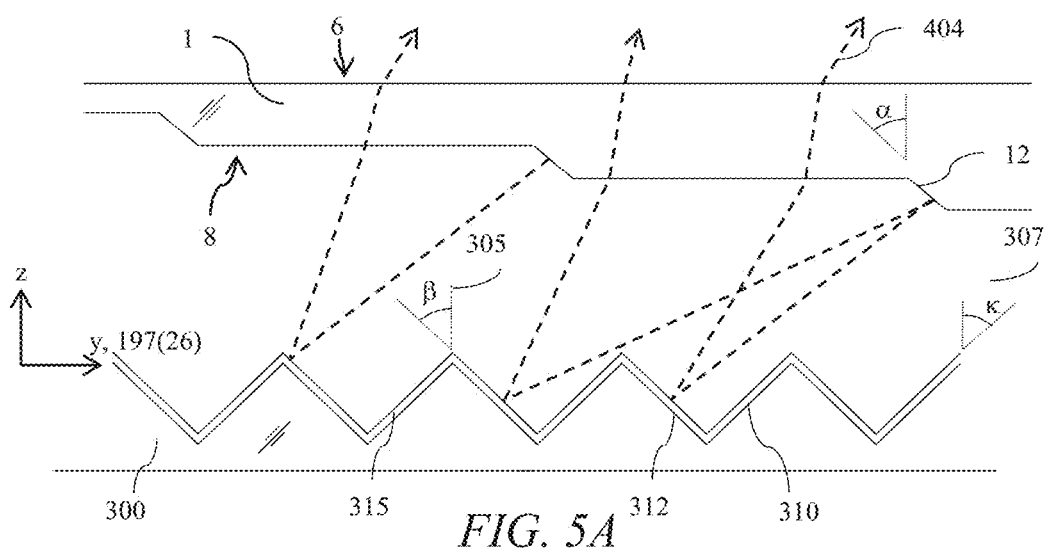
FIG. 5A is a schematic diagram illustrating a side view of the operation of a stepped waveguide and rear reflector.
Figure 5B:
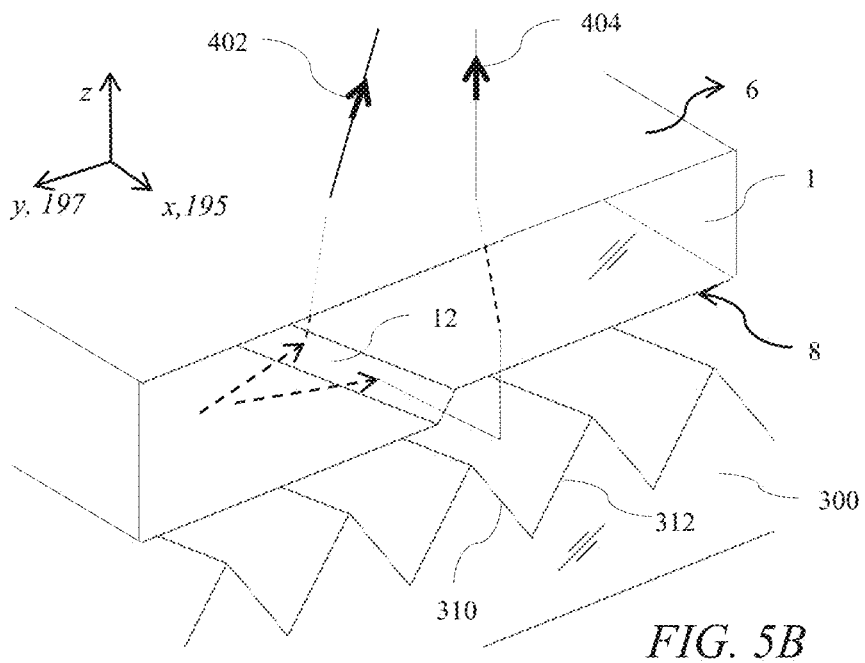
FIG. 5B is a schematic diagram illustrating a front perspective view of the operation of a stepped waveguide and rear reflector.

FIG. 5A is a schematic diagram illustrating a side view of the operation of a stepped waveguide 1 and rear reflector 300; and FIG. 5B is a schematic diagram illustrating a front perspective view of the operation of a stepped waveguide 1 and rear reflector 300. Features of the embodiment of FIGS. 5A-B not discussed in further detail may be assumed to correspond to the features with equivalent reference numerals as discussed above, including any potential variations in the features.

The rear reflector 300 comprises a linear array of reflective facets 312 arranged to reflect light from the light sources 15a-n, that is transmitted through the plurality of facets 12 of the waveguide 1, back through the waveguide 1 to exit through the first guide surface 6.

The facets 12 of the waveguide 1 and the reflective facets 312 of the rear reflector 300 are inclined in the same sense in a common plane containing the y-z axes orthogonal to said lateral direction 195 that is the x-axis.

The prism angle β may be provided such that the light rays 404 with maximum luminance are parallel to the light rays 402 with maximum luminance as will be described hereinbelow with respect to FIG. 5C.

The rear reflector 300 may further comprise return facets 310. The rear reflector 300 is spaced from the waveguide 1 such that the light 404 from an individual facet 12 of the waveguide 1 is incident on plural reflective facets 312 of the rear reflector 300, the rear reflector 300 further comprising intermediate facets 310 extending between the reflective facets 312 of the rear reflector 300, the intermediate facets being inclined in an opposite sense from the reflective facets 312 of the rear reflector 300 at an angle such that said light 404 from the light sources 15 that is transmitted through the plurality of facets 12 of the waveguide 1 is not incident on the intermediate facets 310.

The return facets 310 may be arranged to provide polarisation recirculation as described hereinbelow with respect to FIGS. 6A-B.

The rear reflector 300 may be formed as a prismatic surface further comprising a reflective coating 315, such as aluminum or silver.

Figure 5C:
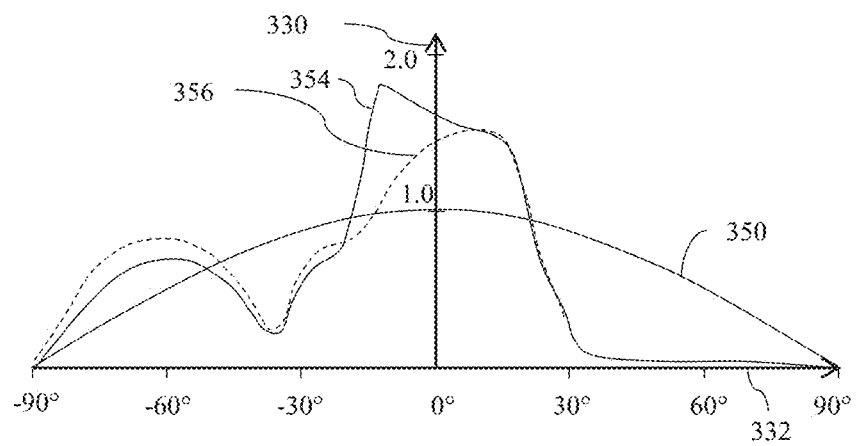
FIG. 5C is a schematic graph illustrating variation of luminance with output angle in the transverse direction.

FIGURE 5C is a schematic graph illustrating variation of luminous intensity 330 with output angle 332 in the transverse direction 197. Features of the embodiment of FIG. 5C not discussed in further detail may be assumed to correspond to the features with equivalent reference numerals as discussed above, including any potential variations in the features.

Profile 354 provides an illustrative luminous intensity profile for waveguide 1 facet 12 inclination angle α of 55°, rear reflector facet 312 angle β of 53° and diffuser S diffusion angle γ of 6°. Profile 354 has an on-axis gain of approximately 1.5 in comparison to a Lambertian distribution 350. Increasing the diffusion angle γ provides a more uniform peak shape for profile 356. The peak luminous intensity may be substantially maximised for on-axis viewing. In operation, the magnifying lens provides a transverse direction 197(26) across the pupil optical window 26. Advantageously output light is directed efficiently to the pupil optical window 26.

Polarisation recirculation of the rear reflector will now be described.

Figure 6A:
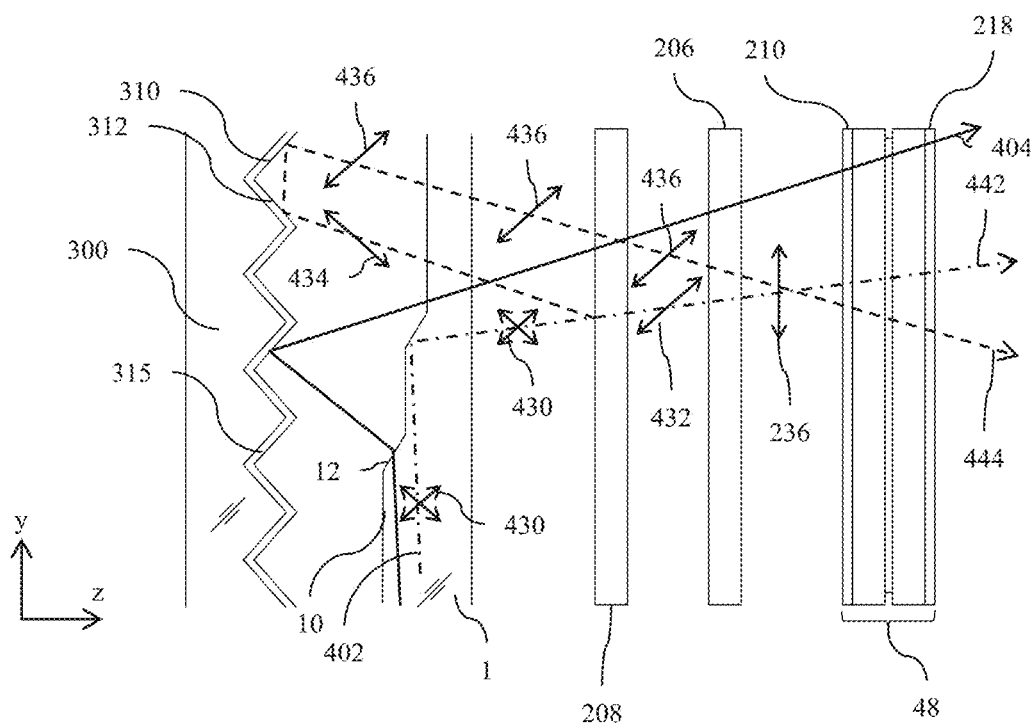
FIG. 6A is a schematic diagram illustrating a side view of polarisation propagation in a directional backlight.
Figure 6B:
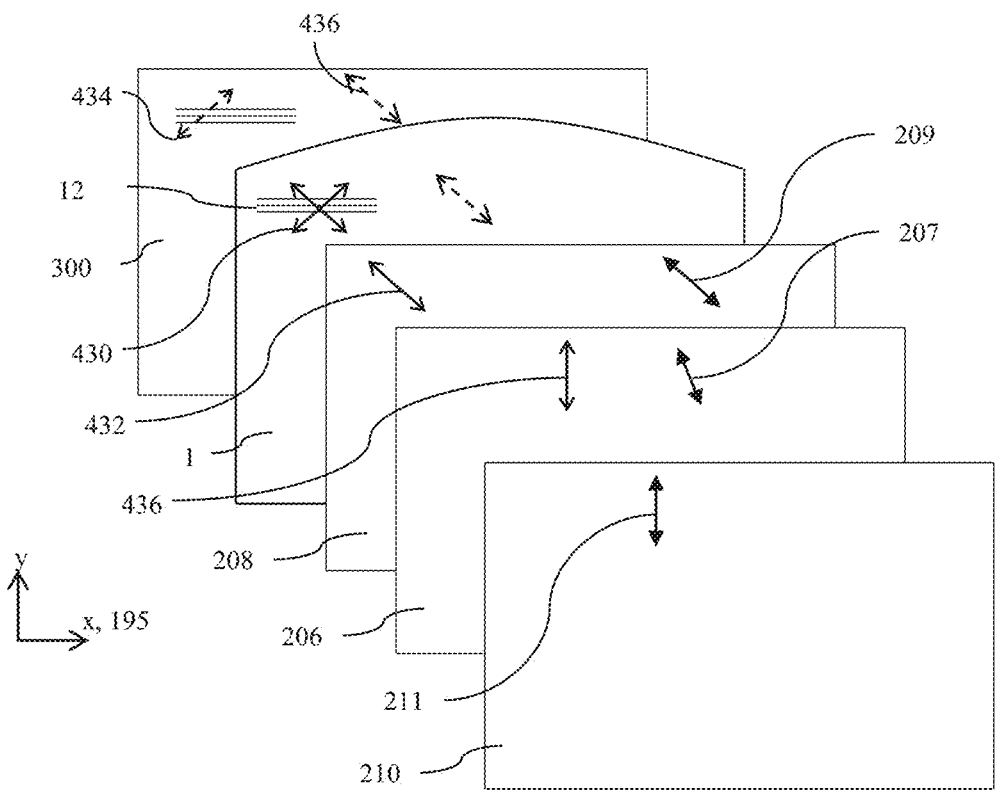
FIG. 6B is a schematic diagram illustrating a front view of polarisation propagation in a directional backlight.

FIG. 6A is a schematic diagram illustrating a side view of polarisation propagation in a directional backlight 20; and FIG. 6B is a schematic diagram illustrating a front view of polarisation propagation in a directional backlight 20. Features of the embodiments of FIGS. 6A-B not discussed in further detail may be assumed to correspond to the features with equivalent reference numerals as discussed above, including any potential variations in the features.

Light rays 402 propagating in the waveguide of waveguide 1 comprise unpolarized light state 430. Light rays reflected by total internal reflection from light extraction feature 12 remain with unpolarized state 430 and incident on reflective polarizer 208 arranged on the input side of the polariser 210 of the spatial light modulator 48.

Light rays 442 transmitted through reflective polarizer 208 are directed through retarder 206 which may be a half-wave retarder with appropriately oriented optical axis direction 207 arranged to direct the first polarization component 236 on to the transmission axis of clean-up input polarizer 210 of spatial light modulator 48.

Returning to the light rays 444 reflected by reflective polarizer 402 as rejected light, said light rays 444 are transmitted through waveguide 1 and incident on the prismatic reflective film 300. The prismatic reflective film 300 may comprise a linear array of pairs of reflective corner facets 310, 312. The corner facets 310, 312 are inclined in opposite senses in a common plane so that the individual light rays 444 undergo a reflection from a pair of the corner facets 310, 312. The light rays 444 are then transmitted by the reflective polariser 208, retarder 206 and input polariser 210 (with transmission axis 211) of the spatial light modulator 48.

The operation of the waveguide 1 and light reflections from the rear reflector 300 is described further in U.S. Pat. Nos. 9,519,153, 10,054,732, and 10,425,635, all of which are herein incorporated by reference in their entireties.

Advantageously, the total display brightness may be increased or light source power reduced at the same brightness, reducing power consumption and extending battery life of the headset.

Figure 7:
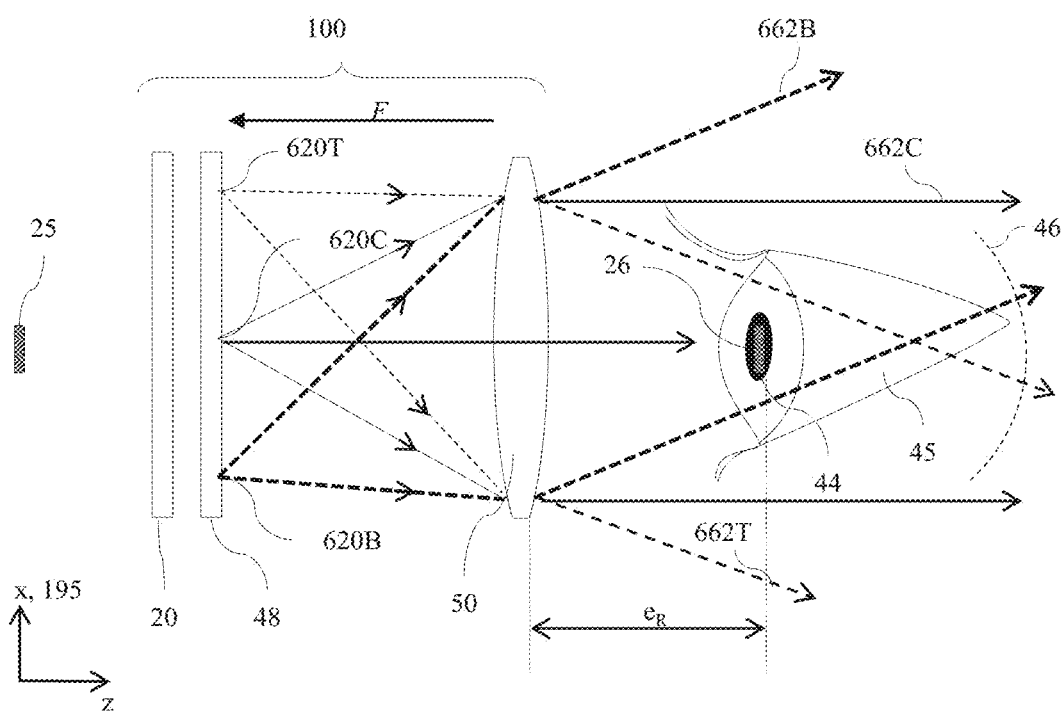
FIG. 7 is a schematic diagram illustrating a side view of a near-eye display apparatus comprising a magnifying lens.

FIG. 7 is a schematic diagram illustrating a side view of a near-eye display apparatus 100 comprising a magnifying lens 50. Features of the embodiment of FIG. 7 not discussed in further detail may be assumed to correspond to the features with equivalent reference numerals as discussed above, including any potential variations in the features.

Magnifying lens 50 has positive optical power, the magnifying lens 50 being arranged to magnify the image formed by the spatial light modulator 48 for the pupil 44 of an eye 45 of a user 47.

Magnifying lens 50 is arranged to magnify the image on the spatial light modulator 48 to the eye by directing appropriate light rays to the pupil 44. The lens of the viewer's eye 45 relays the angular spatial data to spatial pixel data at the retina 46 of the eye 45 such that an image is provided by the display apparatus 100 to the viewer 47.

In operation, top pixel 620T of the spatial light modulator 48 provides light rays 662T, central pixel 620C provides light rays 662C and bottom pixel 620B provides light rays 662B. The eye of the viewer 45 collects the light rays 662T, 662C, 662B and produces an image on the retina 46 of the eye 45 such that an image is perceived with angular size that is magnified in comparison to the angular size of the spatial light modulator 48.

Further in the present embodiments, light sources 15 are imaged by the directional backlight 20 to illumination optical windows 25 and then by magnifying lens 50 to pupil optical windows 26 as described elsewhere herein. The magnifying lens achieves (a) light rays to achieve a magnified image on the retina 26 and (b) imaging of the illumination optical window 25 to provide efficient illumination of the pupil 44, wherein the directional backlight 20 provides desirable illumination optical windows 25.

The imaging of the light sources 15 to the pupil optical windows 26 will now be further described.

Figure 8A:
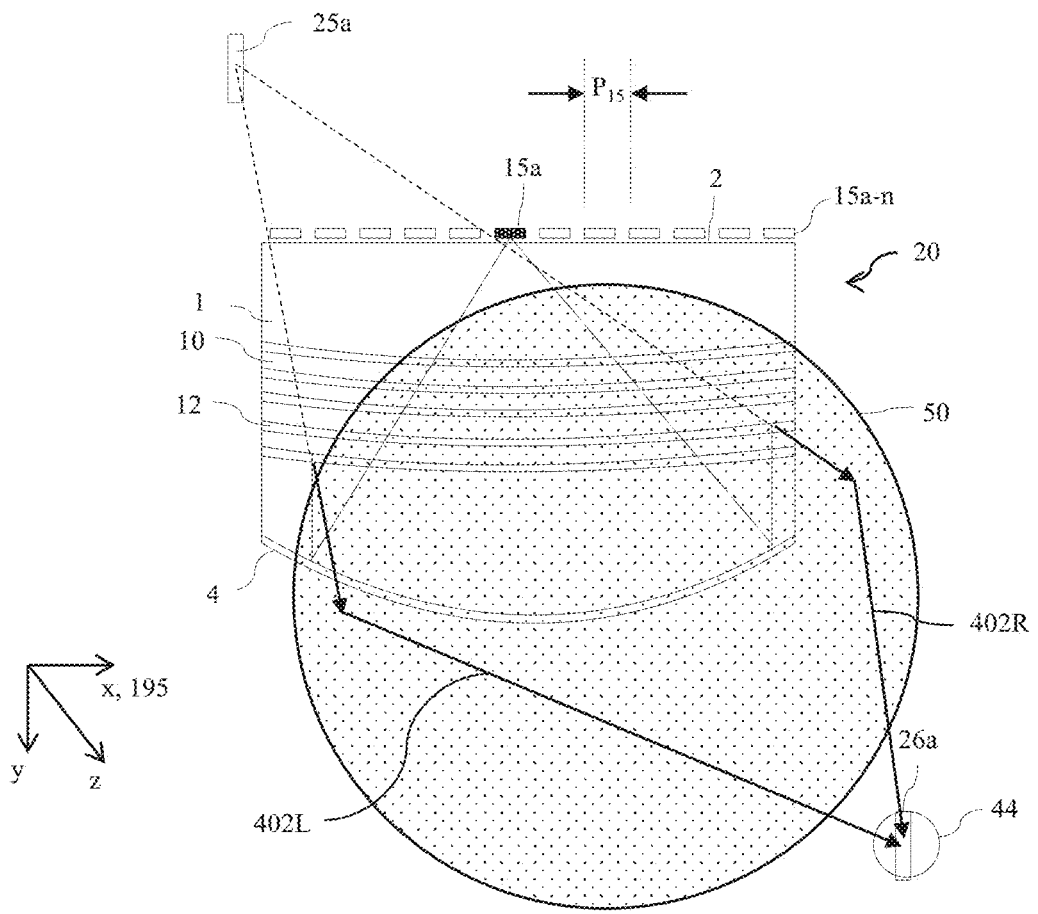
FIG. 8A is a schematic diagram illustrating a front perspective view of the operation of a near-eye display apparatus comprising virtual illumination windows.
Figure 8B:
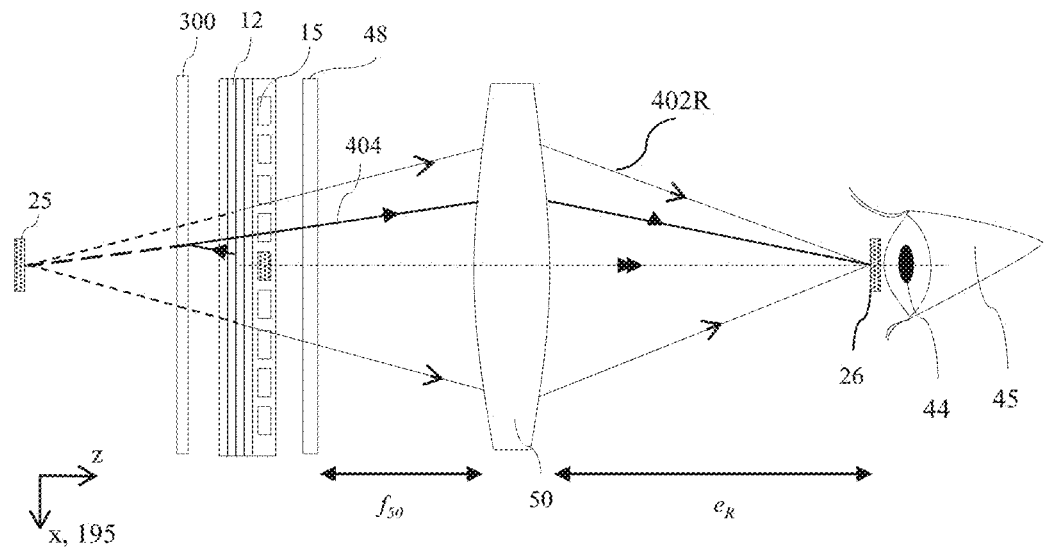
FIG. 8B is a schematic diagram illustrating a top view of the operation of the near-eye display apparatus of FIG. 8A.

FIG. 8A is a schematic diagram illustrating a front perspective view of the operation of the near-eye display apparatus comprising virtual illumination windows; and FIG. 8B is a schematic diagram illustrating a top view of the operation of the near-eye display apparatus of FIG. 8A. Features of the embodiment of FIGS. 8A-B not discussed in further detail may be assumed to correspond to the features with equivalent reference numerals as discussed above, including any potential variations in the features.

In the embodiments of FIGS. 8A-B, the eye-relief $e_R$ is larger than the focal length $f_{50}$ of the magnifying lens 50.

The facets 12 have negative optical power and are arranged to direct the light from the light sources 15a-n to provide respective, virtual illumination optical windows 25a-n in output directions distributed in the lateral direction 195 in dependence on the input positions of the light sources 15a-n, and the magnifying lens 50 is arranged to image the virtual illumination optical windows 25a-n to form the pupil optical windows 26a-n.

Considering light source 15a, virtual illumination optical window 25a is provided by the directional backlight 20 and the magnifying lens 50 images the virtual illumination optical window 25a to a real pupil optical window 26 at or near the pupil 44 of the eye 45. The near-eye display apparatus 100 is thus arranged to direct the light from the light sources 15a-n into respective, pupil optical windows 26a-n distributed across an eyebox 40 in the lateral direction 195 in dependence on the input positions of the light sources 15a-n for arrangements wherein the eye relief $e_R$ is greater than the focal length $f_{50}$ of the magnifying lens 50.

Figure 9A:
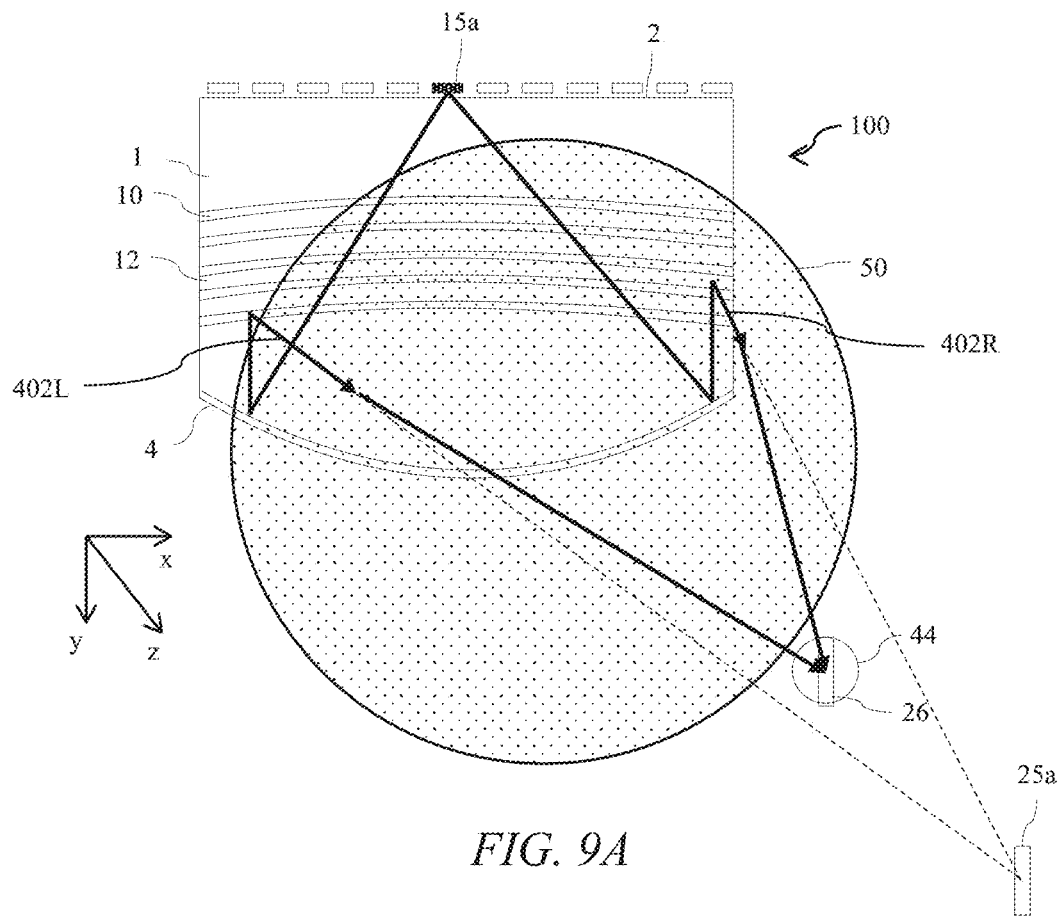
FIG. 9A is a schematic diagram illustrating a front perspective view of the operation of a near-eye display apparatus comprising real illumination windows.
Figure 9B:
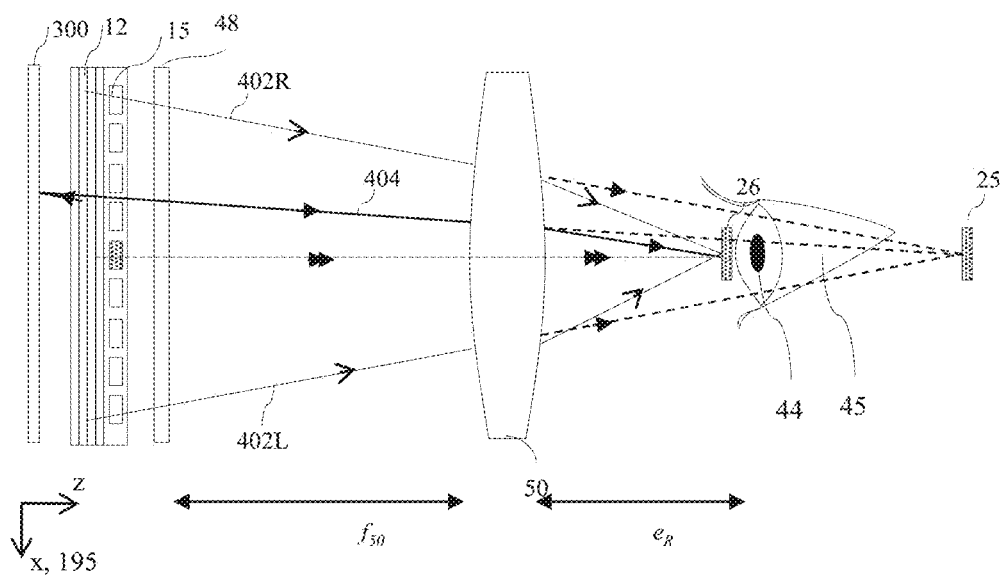
FIG. 9B is a schematic diagram illustrating a top view of the operation of the near-eye display apparatus of FIG. 9A.

FIG. 9A is a schematic diagram illustrating a front perspective view of the operation of the near-eye display apparatus comprising real illumination windows; and FIG. 9B is a schematic diagram illustrating a top view of the operation of the near-eye display apparatus of FIG. 9A. Features of the embodiment of FIGS. 9A-B not discussed in further detail may be assumed to correspond to the features with equivalent reference numerals as discussed above, including any potential variations in the features.

In the embodiments of FIGS. 9A-B, the eye-relief $e_R$ is smaller than the focal length $f_{50}$ of the magnifying lens 50.

The facets 12 have positive optical power. Thus the centre of curvature $C_{12}$ of the facets 12 is on the opposite side of the curved mirror 4 to the centre of curvature $C_4$ and light rays 402L, 404L, 402R, 404R are converging after output from the directional backlight 20.

The facets 4 are arranged to direct the light from the light sources 15a-n to provide respective, real illumination optical windows 25a-n in output directions distributed in the lateral direction 195 in dependence on the input positions of the light sources 15a-n. The real illumination optical windows 25a-n are located at a greater distance from the magnifying lens 50 than the eye relief $e_R$.

The magnifying lens 50 is arranged to image the real illumination optical windows 25a-n to form the pupil optical windows 26a-n.

Considering light source 15a, real illumination optical window 25a is provided by the directional backlight 20 and the magnifying lens 50 images the real illumination optical window 25a to a real pupil optical window 26 at or near the pupil 44 of the eye 45. The near-eye display apparatus 100 is thus arranged to direct the light from the light sources 15a-n into respective, pupil optical windows 26a-n distributed across an eyebox 40 in the lateral direction 195 in dependence on the input positions of the light sources 15a-n for arrangements wherein the eye relief $e_R$ is less than the focal length $f_{50}$ of the magnifying lens 50.

Figure 10A:
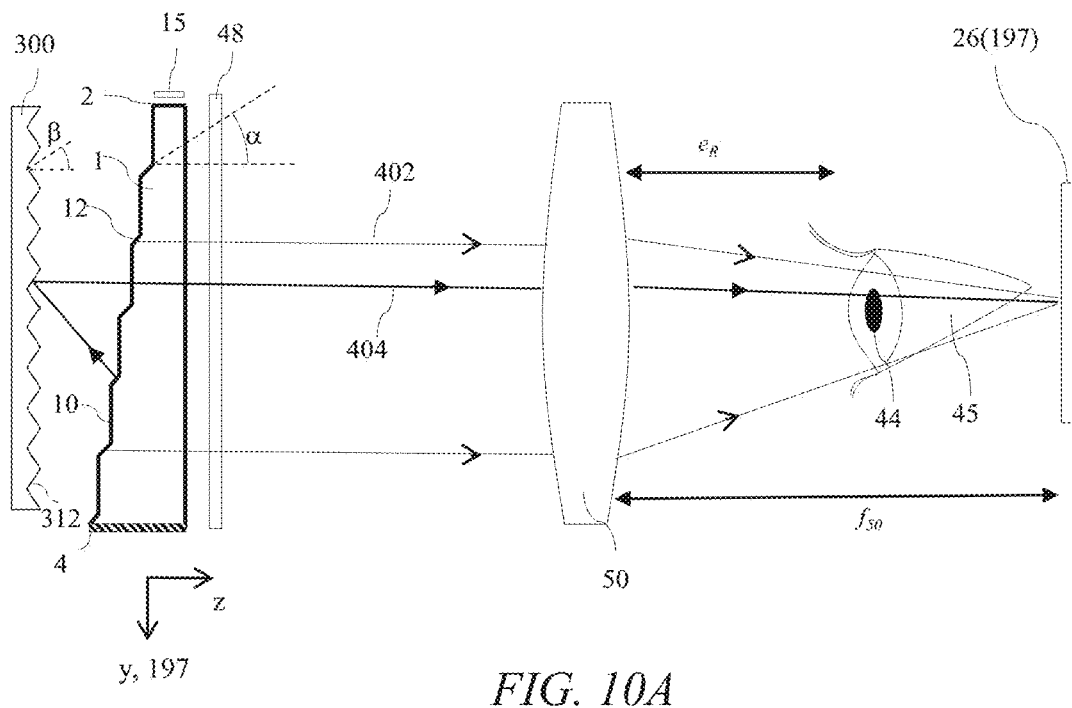
FIG. 10A is a schematic diagram illustrating a side view of the operation of a near-eye display apparatus comprising no pupillation in the transverse direction.
Figure 10B:
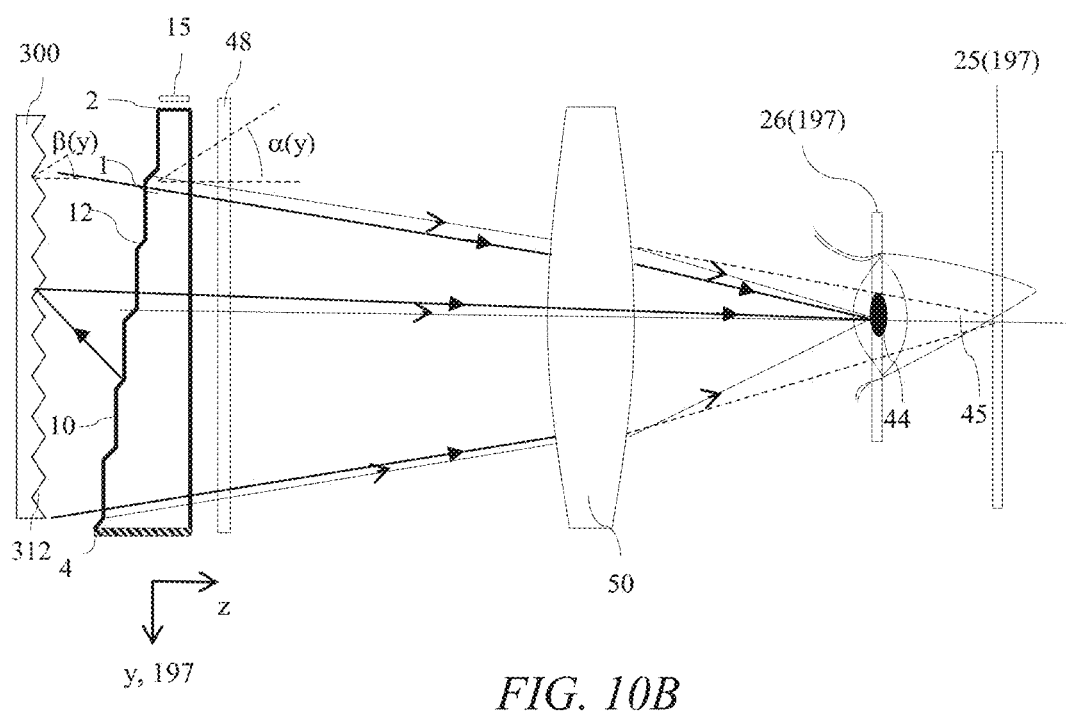
FIG. 10B is a schematic diagram illustrating a side view of the operation of a near-eye display apparatus comprising pupillation in the transverse direction.

FIG. 10A is a schematic diagram illustrating a side view of the operation of the near-eye display apparatus 100 comprising no pupillation in the transverse direction 197; and FIG. 10B is a schematic diagram illustrating a side view of the operation of the near-eye display apparatus 100 comprising pupillation in the transverse direction 197. Features of the embodiment of FIGS. 10A-B not discussed in further detail may be assumed to correspond to the features with equivalent reference numerals as discussed above, including any potential variations in the features.

FIG. 10A illustrates an embodiment wherein each of the facets 12 of the waveguide 1 and reflective facets 312 of the rear reflector have common inclinations α, β respectively along the length of the waveguide 1 (in the y-direction). Such an arrangement provides parallel rays 402, 404 for a given propagation angle in the waveguide 1.

In the embodiment wherein $f_{50}$ is greater than $e_R$ then in the transverse direction 197 orthogonal to the lateral direction at the pupil 44, the magnifying lens 50 provides optical window 26(197) which is behind the eye 45, and the viewer sees an image in the vertical direction with a luminous intensity profile that varies across the image seen on the retina 46.

By way of comparison, in the alternative embodiment of FIG. 10B, the facets 12 of the waveguide 1 have an inclination α that varies across the array of facets 12. Further the reflective facets 312 of the rear reflector 300 have an inclination β that varies across the array of reflective facets 312.

The inclination angle α of the facets 12 and inclination angle β of the reflective facets 312 each vary with location along the y-axis such that a common luminous intensity is directed towards an illumination optical window 25(197) in the transverse direction 197. The magnifying lens 50 then provides a pupil optical window 26(197) at the pupil 44. The eye 45 secs the same luminance across the display in the transverse direction 197. Advantageously uniformity is increased and efficiency increased.

It may be desirable to reduce the complexity of the facets 12 of the waveguide 1 and the reflective facets 312 of the rear reflector 300.

Figure 11A:
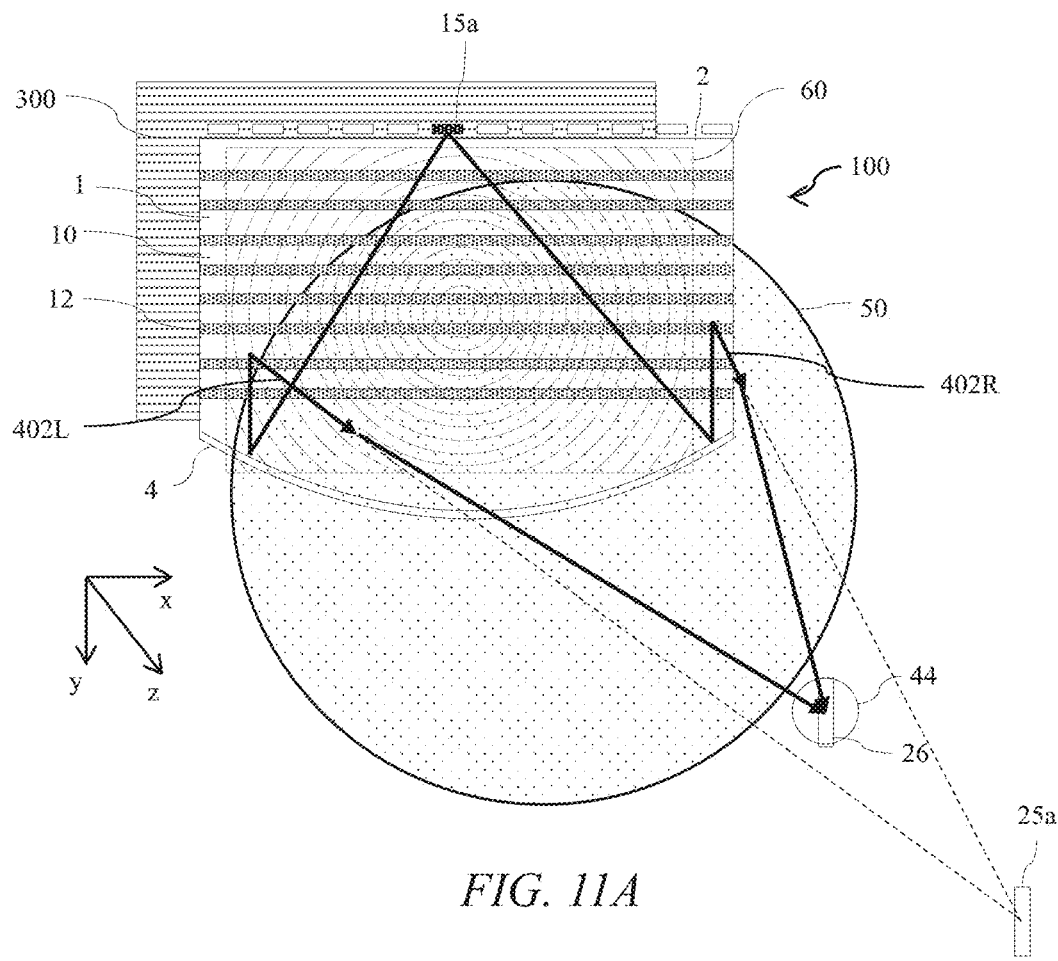
FIG. 11A is a schematic diagram illustrating a front view of a near-eye display apparatus wherein the directional backlight comprises a Fresnel lens.
Figure 11B:
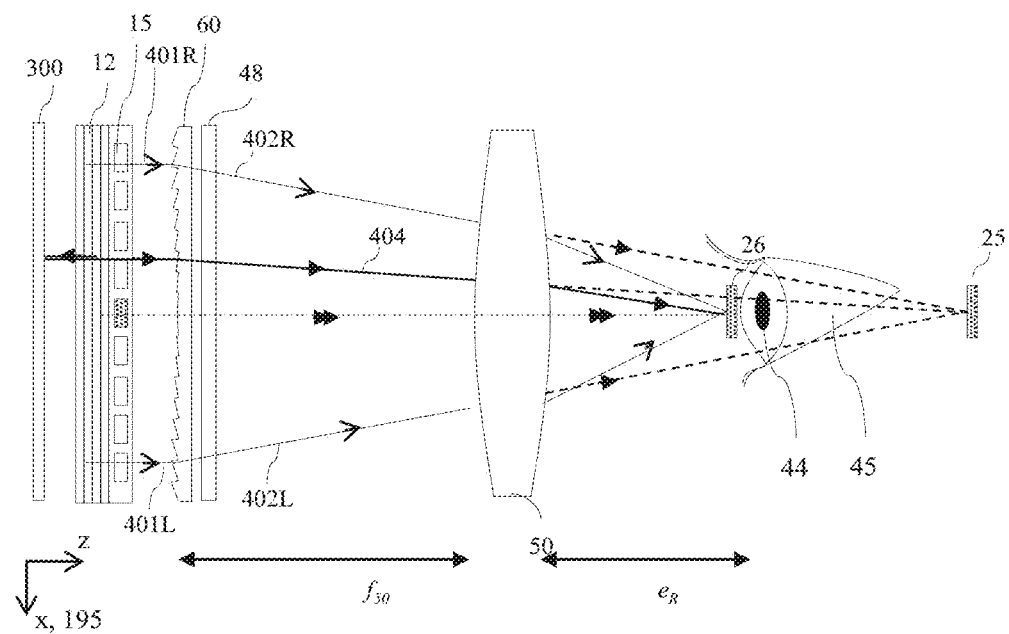
FIG. 11B is a schematic diagram illustrating a top view of a near-eye display apparatus wherein the directional backlight comprises a Fresnel lens.
Figure 11C:
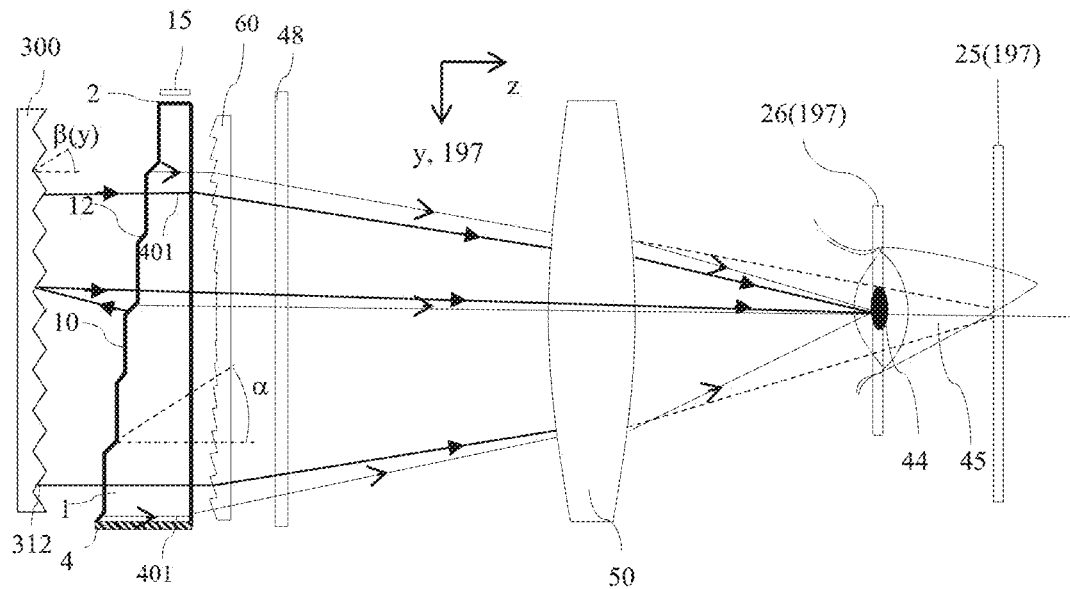
FIG. 11C is a schematic diagram illustrating a side view of a near-eye display apparatus wherein the directional backlight comprises a Fresnel lens.

FIG. 11A is a schematic diagram illustrating a perspective front view of a near-eye display apparatus 100 wherein the directional backlight 20 comprises a Fresnel lens 60; FIG. 11B is a schematic diagram illustrating a top view of a near-eye display apparatus 100 wherein the directional backlight 20 comprises a Fresnel lens 60; and FIG. 11C is a schematic diagram illustrating a side view of a near-eye display apparatus 100 wherein the directional backlight 20 comprises a Fresnel lens 60. Features of the embodiment of FIGS. 11A-C not discussed in further detail may be assumed to correspond to the features with equivalent reference numerals as discussed above, including any potential variations in the features.

In the alternative embodiment of FIGS. 11A-B, the facets 12 of the waveguide 1 and reflective facets 312 of the rear reflector are straight, that is they have an infinite radius of curvature $R_{11}$, $R_{312}$ respectively such that rays 401L, 401R are parallel. Optical power is provided by Fresnel lens 60 that provides illumination optical windows 25 in both lateral direction 195 and transverse direction 197 as described elsewhere herein.

In comparison to FIG. 10B, the facet 12, 312 inclinations α, β are constant along the waveguide 1, rays 401, 403 from the facets 12 and reflective facets 312 are parallel; focussed to illumination optical windows 25 by the Fresnel lens 60; and provided as pupil optical windows by the magnifying lens 50. Straight facets 12, 312 may be more conveniently tooled so that advantageously complexity and cost of fabrication of the waveguide and rear reflector may be reduced.

Illustrative embodiments will now be described using conjugate imaging diagrams to illustrate the imaging of one of the light sources of the array of light sources 15.

Figure 12A:
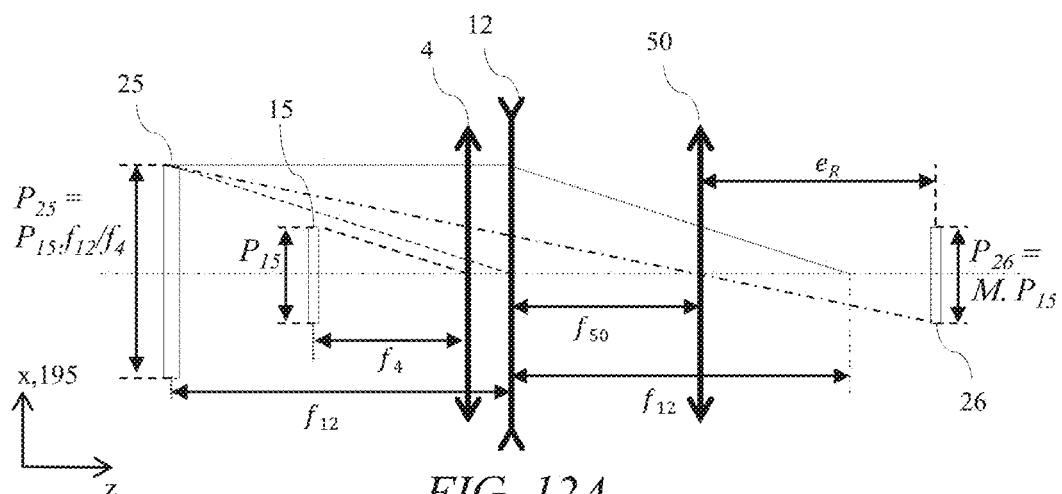
FIG. 12A is a schematic diagram illustrating a conjugate imaging arrangement of a near-eye display apparatus comprising curved facets with negative optical power.

FIG. 12A is a schematic diagram illustrating a conjugate imaging arrangement of the near-eye display apparatus 100 comprising curved facets 12 with negative optical power. Features of the embodiment of FIG. 12A not discussed in further detail may be assumed to correspond to the features with equivalent reference numerals as discussed above, including any potential variations in the features.

The conjugate imaging arrangements described herein illustrate the optical imaging of the directional backlight 20 and magnifying lens 50 of the light sources 15a-n to the pupil optical windows 26a-n by unfolding the optical system.

In the alternative embodiment of FIG. 12A, the eye relief distance $e_R$ is greater than the focal length $f_{30}$ of the magnifying lens 50.

The light source 15 has a pitch $P_{15}$ in the array of light sources and is used to represent the object of the conjugate imaging system. The pupil optical window 26 has a pitch $P_{26}$ in the lateral direction 195 and represents the image of the conjugate imaging system.

The curved reflective end 4 of the waveguide 1 is represented in the conjugate imaging diagram as a positive lens 4 with focal length $f_4$.

The facets 12 are represented in the conjugate imaging diagram as a negative lens 12 with focal length $f_{12}$, wherein the facets 12 are curved with a negative power and have the same direction of curvature as the curved reflective end 4 of the waveguide 1, for example as illustrated in FIG. 3A and FIG. 8A hereinabove.

The magnifying lens 50 is represented in the conjugate imaging diagram as a positive lens 50 with focal length $f_{50}$.

In operation, light rays from the light source 15 are collimated by the curved reflective end 4; that is the light sources are arranged in the focal plane of the curved reflective end 4 with radius R for a waveguide of length L where:

$$R_4 \sim 2 \cdot L \qquad \text{eqn. 1}$$

and for a waveguide 1 of refractive index, n then $f_4$ is the focal length of the reflective end 4 where:

$$f_4 = L/n \qquad \text{eqn. 2}$$

The collimated light rays are then directed onto the curved facets 12 that have negative optical power to provide virtual illumination optical window 25 that is arranged to be imaged by the magnifying lens 50 with focal length $f_{50}$ to the pupil optical window 26.

The pitch $P_{25}$ of the virtual illumination optical window 25 is given by:

$$P_{25} = P_{15} \cdot f_{12}/f_4 \qquad \text{eqn. 3}$$

The focal length $f_{12}$ arising from the curvature $R_{12}$ of the curved facets 12 is arranged to provide imaging of the virtual optical window 25 to the pupil optical window 26 and are both given by:

$$R_{12} = f_{12} = \frac{f_{50}^2}{f_{50} - e_R} \qquad \text{eqn. 4}$$

The magnification of the LED of the light source array 15 is given by:

$$M = \left(\frac{f_{50} - e_R}{f_{50}}\right)\left(\frac{f_{12}}{f_4}\right) \qquad \text{eqn. 5}$$

so that $$P_{26} = M \cdot P_{15} \qquad \text{eqn. 6}$$

An illustrative embodiment is shown in TABLE 1.

TABLE 1

| Item | Value |
| --- | --- |
| Waveguide 1 refractive index, n | 1.5 |
| Imager width, w | 50 mm |
| Magnifying lens 50 focal length $f_{50}$ | 70 mm |

TABLE 1-continued

| Item | Value |
| --- | --- |
| Eye relief, $e_R$ | 20 mm |
| Waveguide 1 length, L | 50 mm |
| Waveguide 1 reflective end 4 radius of curvature, $R_4$ | 100 mm |
| Waveguide 1 reflective end 4 focal length, $f_4$ | 33 mm |
| Curved facet 12 focal length $f_{12}$ | 98 mm |
| Curved facet 12 radius of curvature $R_{12}$ | 98 mm |
| Magnification, M | 2 |
| Pupil optical window 26 pitch, $P_{26}$ | 1 mm |
| Light source array 15 LED pitch, $P_{15}$ | 0.5 mm |
| Total eyebox 40 width in lateral direction 195 | 12 mm |
| Number of individually addressable LED light sources 15 | 12 |
| Total width of array of light sources, 15 | 6 mm |

Table 1 illustrates that a high resolution optical window may be provided at the pupil of the eye with an LED array with desirable pitch $P_{26}$ of pupil optical windows 26. Across a pupil 44 of diameter 4 mm, the light source array 15 may be provided for example with between five and eight pupil optical windows 26 illuminated by respective light sources 15, so that the pupil 44 is overfilled to achieve image uniformity and movement in the eyebox within the response time of the control system 500 to adjust the light sources 15 that are illuminated.

Figure 12B:
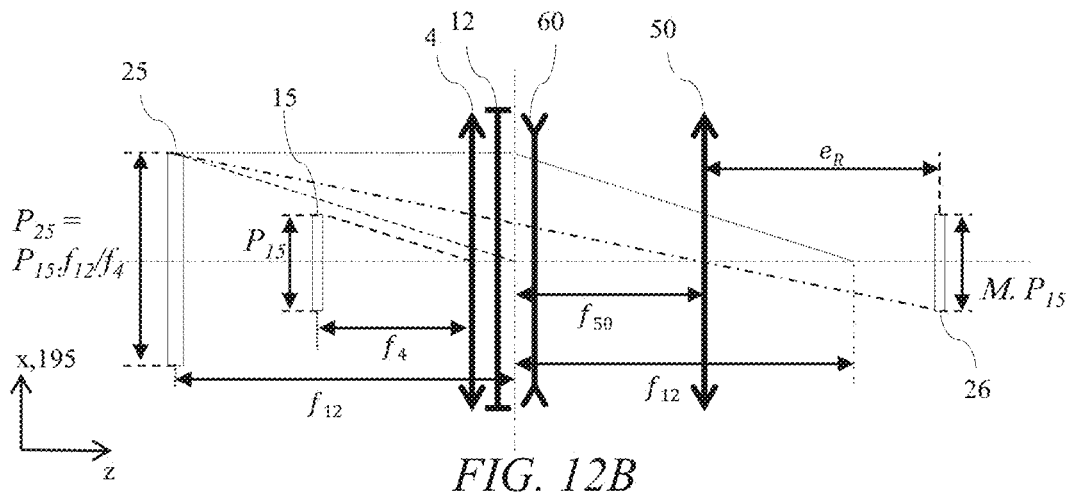
FIG. 12B is a schematic diagram illustrating a conjugate imaging arrangement of a near-eye display apparatus comprising linear facets and a Fresnel lens with negative optical power.
Figure 12C:
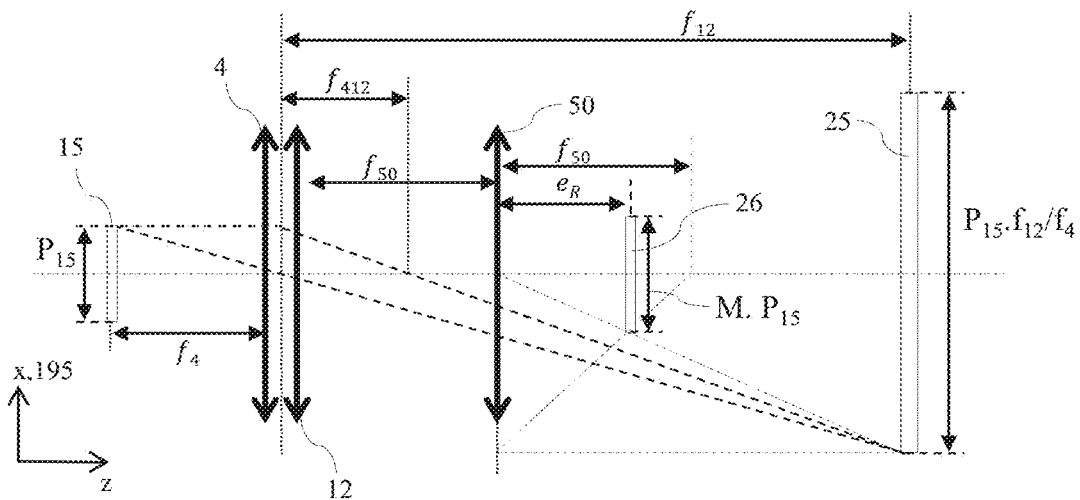
FIG. 12C is a schematic diagram illustrating a conjugate imaging arrangement of a near-eye display apparatus comprising curved facets with positive optical power.
Figure 12D:
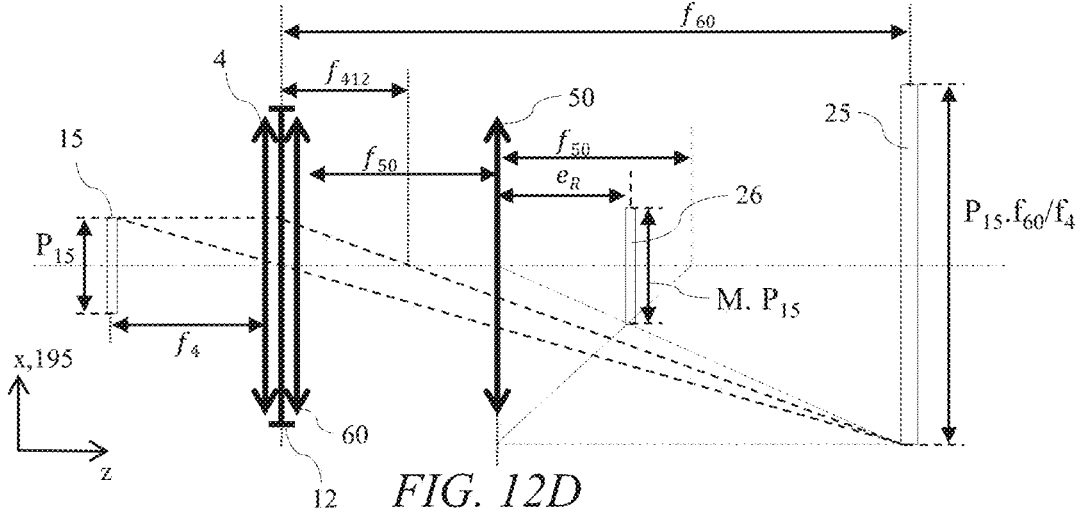
FIG. 12D is a schematic diagram illustrating a conjugate imaging arrangement of a near-eye display apparatus comprising linear facets and a Fresnel lens with positive optical power.

FIG. 12B is a schematic diagram illustrating a conjugate imaging arrangement of the near-eye display apparatus 100 comprising linear facets 12, 312 and a Fresnel lens 60 with negative optical power; FIG. 12C is a schematic diagram illustrating a conjugate imaging arrangement of the near-eye display apparatus 100 comprising curved facets 12, 312 with positive optical power; FIG. 12D is a schematic diagram illustrating a conjugate imaging arrangement of the near-eye display apparatus 100 comprising linear facets 12, 312 and a Fresnel lens 60 with positive optical power; and FIG. 12E is a schematic diagram illustrating a conjugate imaging arrangement of the near-eye display apparatus 100 comprising curved facets 12, 312 with negative optical power and a Fresnel lens 60 with positive optical power.

In the embodiments of FIGS. 12A-E, the curvature of the reflective facets 312 of the rear reflector is omitted for clarity. In general, the curved reflective facets 312 are arranged to operate in the same manner as the facets 12 of the waveguide.

In FIG. 12B, the near-eye display apparatus 100 further comprises a Fresnel lens 60 that has negative optical power and is arranged to direct the light from the light sources 15a-n to provide respective, virtual illumination optical windows 25a-n in output directions distributed in the lateral direction 195 in dependence on the input positions of the light sources 15a-n; and the magnifying lens 50 is arranged to image the virtual illumination optical windows 25a-n to form the pupil optical windows 26a-n. FIG. 12B comprises linear facets 12, 312 and Fresnel lens 60 in place of the curved facets 12, with focal length $f_{60}$ being the same as focal length $f_{12}$ and otherwise operation is similar to FIG. 12A. Advantageously the Fresnel lens may provide increased uniformity in the transverse direction.

Figure 12E:
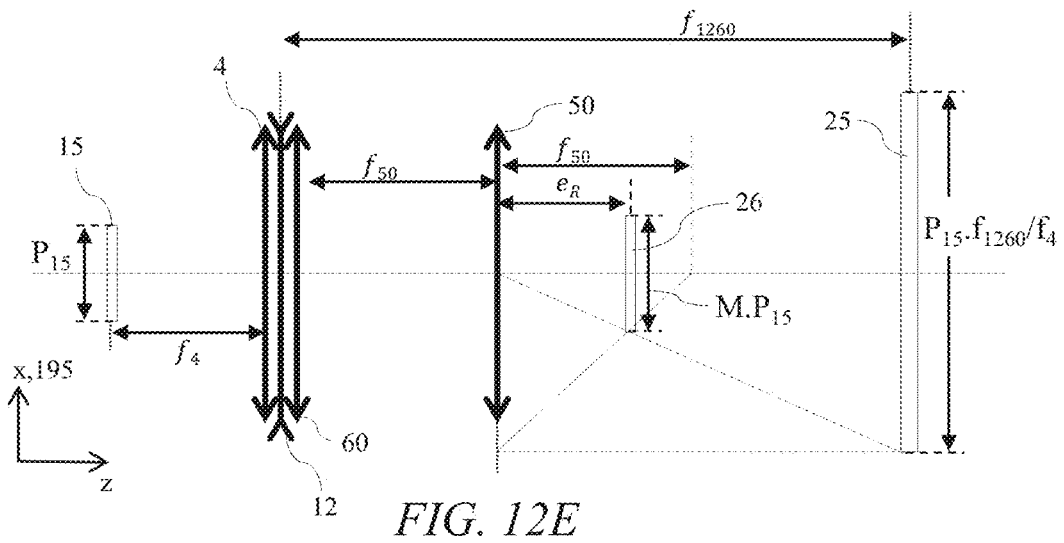
FIG. 12E is a schematic diagram illustrating a conjugate imaging arrangement of a near-eye display apparatus comprising curved facets with negative optical power and a Fresnel lens with positive optical power.

In the alternative embodiments of FIGS. 12C-E, the eye relief distance $e_R$ is less than the focal length $f_{50}$ of the magnifying lens 50.

FIG. 12C illustrates further the arrangement of FIG. 9B with real illumination optical windows 25 arranged behind the eye 45.

In FIG. 12D, the near-eye display apparatus 100 further comprises a Fresnel lens 60 that has positive optical power and is arranged to direct the light from the light sources 15a-n to provide respective, real illumination optical windows 25a-n in output directions distributed in the lateral direction 195 in dependence on the input positions of the light sources 15a-n; and the magnifying lens 50 is arranged to image the real illumination optical windows 25a-n to form the pupil optical windows 26a-n. FIG. 12D comprises a Fresnel lens 60 in place of the curved facets 12, with focal length $f_{60}$ being the same as focal length $f_{12}$; otherwise operation is similar to FIG. 12C. Advantageously the Fresnel lens may provide increased uniformity in the transverse direction.

FIG. 12E comprises curved facets 12, 312 and Fresnel lens 60 with positive optical power in addition to the curved facets 12, with focal length $f_{1260}$ being the combined focal length of the curved facets 12 and Fresnel lens 60. Advantageously the Fresnel lens may provide some focusing in the transverse direction 197, improving the image uniformity at the retina 46.

In other embodiments, not shown, the imaging of the optical window in the lateral direction 195 may be provided by the facets 12 and the imaging of the optical window in the transverse direction 197 may be provided by a cylindrical Fresnel lens 60. Advantageously uniformity may be increased.

Arrangements of magnifying lens will now be described.

Figure 13A:
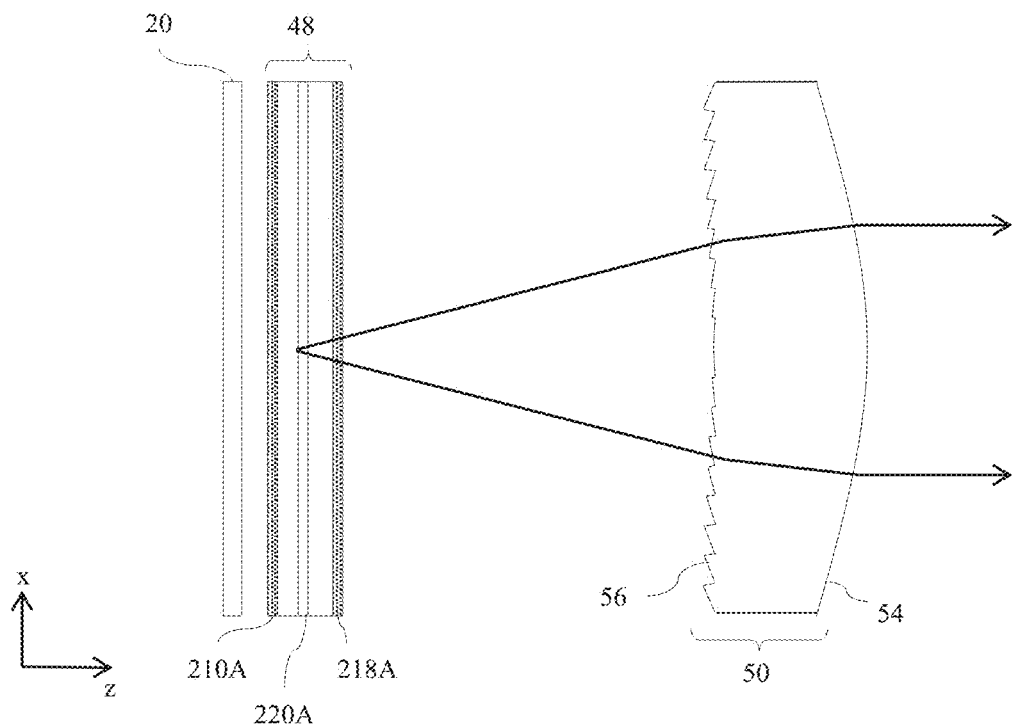
FIG. 13A is a schematic diagram illustrating a side view of a near-eye display apparatus comprising a refractive magnifying lens.

FIG. 13A is a schematic diagram illustrating a side view of a near-eye display apparatus 100 comprising a refractive magnifying lens 50. Features of the embodiment of FIG. 13A not discussed in further detail may be assumed to correspond to the features with equivalent reference numerals as discussed above, including any potential variations in the features. Magnifying lens 50 comprises a Fresnel surface 56 and a curved surface 54.

Figure 13B:
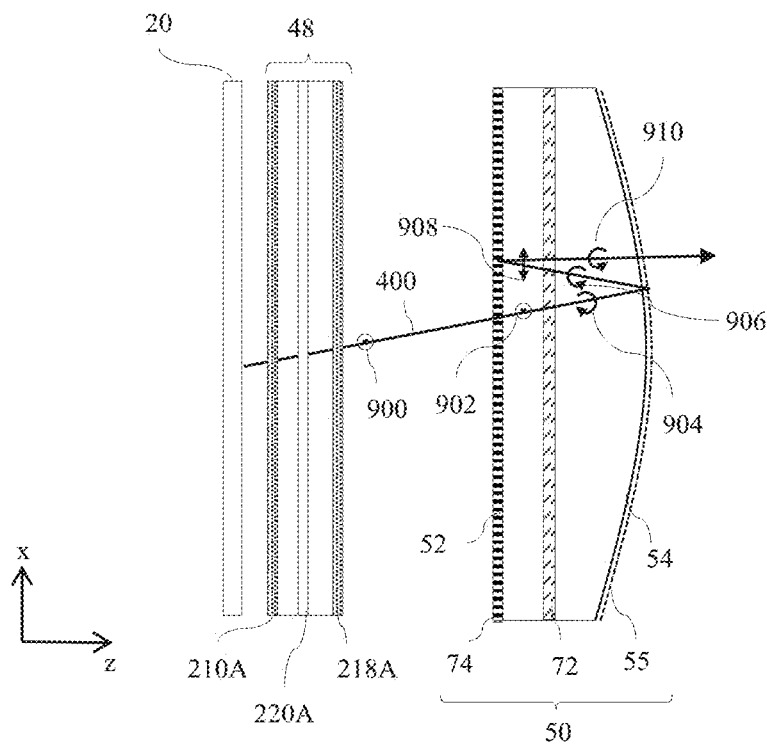
FIG. 13B is a schematic diagram illustrating a side view of a near-eye display apparatus comprising a catadioptric magnifying lens.

FIG. 13B is a schematic diagram illustrating a side view of a near-eye display apparatus 100 comprising a catadioptric magnifying lens 50. Features of the embodiment of FIG. 13B not discussed in further detail may be assumed to correspond to the features with equivalent reference numerals as discussed above, including any potential variations in the features.

Catadioptric magnifying lens 50 comprises reflective polariser 74 arranged on a plane input surface 52 of the magnifying lens 50. Curved surface 54 comprises a half mirror coating 55 formed on its surface, which may be a deposited layer of reflective material such as aluminium. Quarter waveplate 72 is arranged between the reflective polariser 74 and curved surface 54.

In operation, output light rays 400 from the backlight 20 have a polarisation state 900 provided by the polariser 218 of the spatial light modulator 48. Polarisation state 900 is transmitted by the reflective polariser 74 as polarisation state 902 and converted to circular polarisation state 904. After reflection from the half-silvered mirror 55 at the curved surface 54, the light ray 400 is provided with optical power, and also with opposite-handed circular polarisation state 906. Passing back through the quarter waveplate 72 provides polarisation state 908 that is reflected from reflective polariser 74. The light ray then passes again through the quarter waveplate 72 with polarisation state 910 and some light is transmitted as output light from the half mirror coating with some refractive power. The embodiment of FIG. 13B advantageously achieves reduced focal length for equivalent optical aberrations in comparison to the refractive lens of FIG. 13A. This is due to the reflective nature of much of the optical power provided by the surface 54 in reflection. In other embodiments (not shown) further refractive elements may be provided to further reduce optical aberrations.

Figure 14:
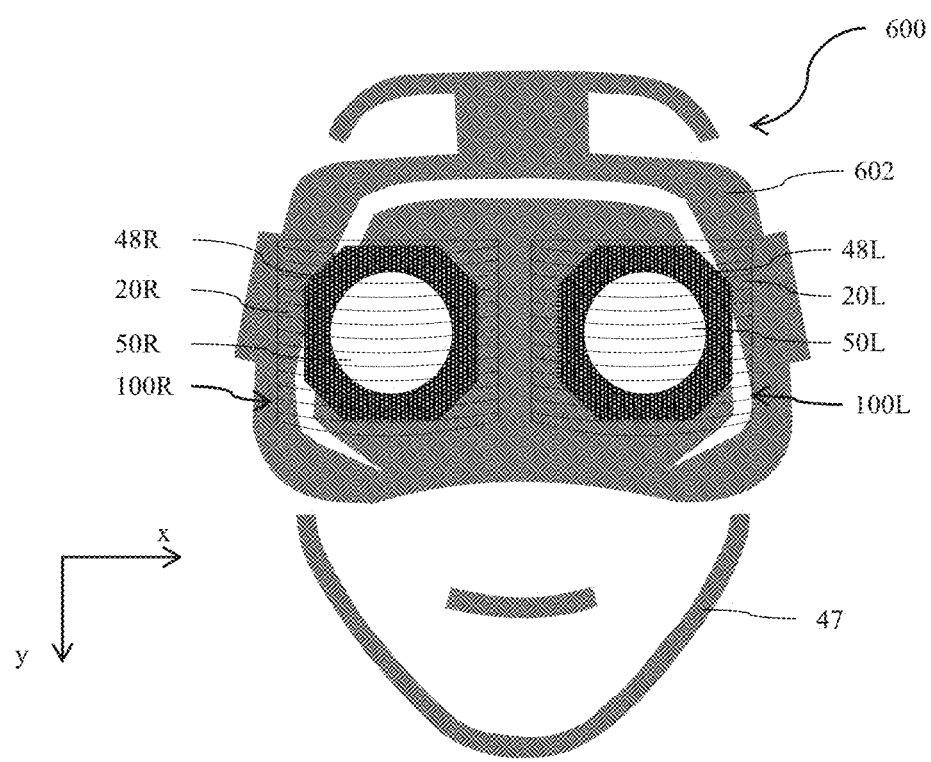
FIG. 14 is a schematic diagram illustrating in front view a virtual reality head-worn display apparatus comprising left-eye and right-eye near-eye display apparatuses.

FIG. 14 is a schematic diagram illustrating in front view virtual reality head-worn display apparatus 600 comprising left-eye and right-eye near-eye display apparatuses 100R, 100L. Features of the embodiment of FIG. 14 not discussed in further detail may be assumed to correspond to the features with equivalent reference numerals as discussed above, including any potential variations in the features.

In the alternative embodiment of FIG. 14, the head-worn display 600 comprises head-mounting apparatus and left-eye and right-eye near-eye display apparatuses 100R, 100L as described elsewhere herein. The head-worn display apparatus 600 comprises a near-eye display apparatus 100 that is arranged to extend across at least one eye 45 of a viewer 47 when the head-worn display apparatus 600 is worn. The total power consumption of the head-worn display apparatus 600 may be reduced, and weight of batteries reduced and/or lifetime increased.

Pupil detection systems 502, 504 may be provided for each eye 45L, 45R of the user 47 and luminance matching achieved between left and right eye pupils 44L, 44R by control of respective light source arrays 15L, 15R. Advantageously image uniformity and comfort may be increased.

In an alternative embodiment only one of the near-eye display apparatuses 100R, 100L may be provided while the other eye sees the external environment. Advantageously the visibility of the external environment is increased and cost and weight reduced.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A near-eye display apparatus comprising:
 a directional backlight comprising:
  a waveguide comprising an input end; and
  an array of light sources disposed at different input positions in a lateral direction across the input end of the waveguide and arranged to input light into the waveguide,
 the waveguide further comprising first and second, opposed guide surfaces for guiding the light from the light sources along the waveguide, and a reflective end facing the input end for reflecting the light from the light sources back through the waveguide, the first guide surface being arranged to guide light by total internal reflection and the second guide surface having a stepped shape comprising (a) a plurality of facets oriented to extract the light from the light sources, after reflection from the reflective end, out of the waveguide through the first guide surface, and (b) intermediate regions between the facets that are arranged to guide light through the waveguide;
 a spatial light modulator arranged to modulate the light extracted from the waveguide to form an image; and
 a magnifying lens having positive optical power, the magnifying lens being arranged to magnify the image formed by the spatial light modulator for the pupil of an eye of a user, and
 wherein the near-eye display apparatus is arranged to direct the light from the light sources into respective, pupil optical windows distributed across an eyebox in the lateral direction in dependence on the input positions of the light sources.

2. A near-eye display apparatus according to claim 1, wherein the reflective end is curved.

3. A near-eye display apparatus according to claim 1, wherein the reflective end has positive optical power in a lateral direction across the waveguide.

4. A near-eye display apparatus according to claim 1, wherein the facets of the waveguide are curved.

5. A near-eye display apparatus according to claim 1, wherein
 the facets have negative optical power and are arranged to direct the light from the light sources to provide respective, virtual illumination optical windows in output directions distributed in the lateral direction in dependence on the input positions of the light sources, and
 the magnifying lens is arranged to image the virtual illumination optical windows to form the pupil optical windows.

6. A near-eye display apparatus according to claim 1, wherein
 the near-eye display apparatus further comprises a Fresnel lens that has negative optical power and is arranged to direct the light from the light sources to provide respective, virtual illumination optical windows in output directions distributed in the lateral direction in dependence on the input positions of the light sources; and
 the magnifying lens is arranged to image the virtual illumination optical windows to form the pupil optical windows.

7. A near-eye display apparatus according to claim 1, wherein
 the facets have positive optical power and are arranged to direct the light from the light sources to provide respective, real illumination optical windows in output directions distributed in the lateral direction in dependence on the input positions of the light sources, and
 the magnifying lens is arranged to image the real illumination optical windows to form the pupil optical windows.

8. A near-eye display apparatus according to claim 1, wherein
 the near-eye display apparatus further comprises a Fresnel lens that has positive optical power and is arranged to direct the light from the light sources to provide respective, real illumination optical windows in output directions distributed in the lateral direction in dependence on the input positions of the light sources; and
 the magnifying lens is arranged to image the real illumination optical windows to form the pupil optical windows.

9. A near-eye display apparatus according to claim 1, further comprising:
 a pupil detection system arranged to detect the location of the pupil of the eye; and
 a control system arranged to control the array of light sources to provide illumination of pupil optical windows that illuminate the pupil and not to provide illumination to at least some pupil optical windows that do not illuminate the pupil.

10. A near-eye display apparatus according to claim 1, wherein the directional backlight further comprises a rear reflector comprising a linear array of reflective facets arranged to reflect light from the light sources, that is transmitted through the plurality of facets of the waveguide, back through the waveguide to exit through the first guide surface.

11. A near-eye display apparatus according to claim 1, wherein the facets of the waveguide and the reflective facets of the rear reflector are inclined in the same sense in a common plane orthogonal to said lateral direction.

12. A near-eye display apparatus according to claim 11, wherein the rear reflector is spaced from the waveguide such that the light from an individual facet of the waveguide is incident on plural reflective facets of the rear reflector, the rear reflector further comprising intermediate facets extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets.

13. A near-eye display apparatus according to claim 1, wherein the facets of the waveguide have an inclination that varies across the array of facets.

14. A near-eye display apparatus according to claim 1, wherein the reflective facets of the rear reflector have an inclination that varies across the array of reflective facets.

15. A near-eye display apparatus according to claim 1, wherein the reflective facets of the rear reflector are curved.

16. A head-worn display apparatus comprising a near-eye display apparatus according to claim 1 that is arranged to extend across at least one eye of a viewer when the head-worn display apparatus is worn.

* * * * *